United States Patent [19]

Tentler et al.

[11] Patent Number: 5,190,075

[45] Date of Patent: Mar. 2, 1993

[54] VISCOSITY-INSENSITIVE MECHANICAL FLUID FLOW REGULATOR

[76] Inventors: Michael L. Tentler, 11420 Luz Rd., San Diego, Calif. 92127; Gerald L. Wheeler, 10390-D E. Briar Oaks, Stanton, Calif. 90680

[21] Appl. No.: 500,007

[22] Filed: Mar. 27, 1990

Related U.S. Application Data

[63] Continuation-in-part of Ser. No. 329,433, Mar. 28, 1989, Pat. No. 5,024,105.

[51] Int. Cl.$^5$ ............................................. G05D 7/00
[52] U.S. Cl. ................................. 137/501; 137/467.5; 137/504
[58] Field of Search .................... 137/501, 504, 467.5, 137/101.21

[56] References Cited

U.S. PATENT DOCUMENTS

| 316,626 | 4/1985 | Jackson | 137/501 |
|---|---|---|---|
| 2,139,050 | 12/1938 | Vickers | 137/501 X |
| 2,149,673 | 3/1939 | Godfrey | 137/504 X |
| 2,219,408 | 10/1940 | Benz et al. | 137/501 X |
| 2,623,331 | 12/1952 | Greening | 137/501 |
| 4,210,171 | 7/1980 | Rikuta | 137/501 |
| 4,776,367 | 10/1988 | Hilmersson et al. | 137/501 |

Primary Examiner—Stephen M. Hepperle
Attorney, Agent, or Firm—William C. Fuess

[57] ABSTRACT

The differential-pressure-sensing and variable-area-occluding fundtions within variable-area flowmeters and flow regulators are performed by separate, but mechanically connected, elements. A housing defines a channel for guiding fluid flow from an upstream to a downstream location. A differential pressure sensor moves in a direction substantially perpendicular to the direction of fluid flow in response to a differential fluid pressure between the upstream and downstream locations. Because the movement of the pressure sensor is substantially perpendicular to the flowing fluid with which it comes in contact, it is substantially insensitive to fluid friction and to changes in fluid viscosity. A flow obstructor connects to the sensor and moves therewith to variably obstruct the channel and its flow of fluid from the upstream to the downstream location. Fluid frictional forces on the movement of the flow obstructor vary with changes in fluid viscosity. However the ratio of the area of the flow obstructor to the area of the pressure sensor, which ratio substantially equals the ratio of the fluid frictional forces to the pressure force, is consistently low, typically 1:100. Consequently the overall flowmeter or flow regulator is relatively insensitive to changes in fluid viscosity. It typically exhibits less than ±1% deviation in an indicated, or regulated, flow rate for variations in fluid viscosity on the order of ×20.

23 Claims, 6 Drawing Sheets

VISCOSITY-INSENSITIVE MECHANICAL FLUID FLOW REGULATOR

REFERENCE TO RELATED PATENT APPLICATIONS

The present application is a continuation-in-part of prior U.S. patent application Ser. No. 329,433 filed Mar. 28, 1989, now U.S. Pat. No. 5,024,105, for a VISCOSITY-INSENSITIVE VARIABLE-AREA FLOWMETER. Michael L. Tentler, one of the named inventors of the claimed subject matter of the prior application, is also the named inventor of the claimed subject matter of the present application. The prior application is assigned to the same assignee as the present application.

The present application is also related to U.S. patent application Ser. No. 331,880 filed Mar. 31, 1989, for PRECISION DISPENSING OF VARYING VISCOSITY FLUIDS IN A PRESCRIBED MIX RATIO. This related patent application also is filed in the name of inventor Michael L. Tentler, and is assigned to the same assignee as the present application.

BACKGROUND OF THE INVENTION

Field Of The Invention

The present invention generally concerns variable-area flowmeters and mechanical flow regulators. The invention particularly concerns highly accurate flowmeters and flow regulators that are substantially insensitive to changes in the viscosity of fluids.

The invention further concerns the use of viscosity-insensitive flowmeters and flow regulators in systems for mixing two fluids together in prescribed relative proportions and to a predetermined total volume, particularly for mixing together and dispensing carbonated water and flavored soft drink syrup in a soft drink dispenser.

Prior Fluid Dispensing Systems

Soft drinks are typically made by mixing a syrup with carbonated water. The dispensers typically inject the water and syrup simultaneously into a mixing chamber where they are mixed together. The mixed fluids are then dispensed through a nozzle into a drinking cup. The two fluids are normally supplied for coextensive time durations, and the mix ratio is typically controlled using manually-adjustable metering pins.

To keep the quality of the mixed drinks at a desired level, the syrup and water have to be mixed with a very high degree of accuracy. Syrup is desirably mixed with water in a predetermined proportion, typically from ⅓ to ⅕ syrup to water. Syrup manufacturers, and sellers of soft drinks, believe that the accuracy of the mixing, or "brix", should desirably be not worse than ±1%. Variations from the desired mix accuracy result in uneconomical use of the syrup component, and undesirable variations in the quality of the mixed drink product.

The desired mixing precision has not yet been achieved in many soft drink dispensers. One source of error in mixing precision is due to variations in the absolute, and relative, pressures of the syrup and of the water during the period of dispensing operation, and between dispensing periods. These pressure variations tend to alter the absolute flow rate of the syrup and/or the water, and the flow rate of the syrup relative to the flow rate of the water. These varying flow rates, in turn, change the mixing, or "brix" of the beverage.

To maintain a fixed mix ratio, many soft drink dispensers provide for manual adjustment of flow control metering pins in the syrup and water supply lines. The adjustment procedure is time consuming and cumbersome. A special container called a "standard measuring cup" is employed. The standard measuring cup has two reservoirs calibrated by a single scale, typically two vertical cylinders with a centrally-located scale. The volumes of the two reservoirs per scale unit of fill are maintained in a fixed proportion, for example five to one (5:1). The syrup and water output flows are separated. Each flow is plumbed into a corresponding reservoir of the standard measuring cup. The flows are adjusted to be in proper proportion to each other by observing the filling of the standard measuring cup. Normally this is done by adjustment of the flow control metering pins. The adjustment procedure must be periodically repeated in order to account for any long term changes in the pressures or viscosities of the dispensed fluid. Short term variations in flow rates during a single dispensing operation, or between individual dispensing operations, cannot be corrected for satisfactorily by periodic manual adjustments.

Some soft drink dispensers provide for automatic adjustment of fluid flow rates. These dispensers generally are unduly complex. Most still require substantial manual adjustment when changing from one type of syrup to another.

Some dispensers employ a flow washer as a flow-regulating device. Flow washers are reasonably effective in precisely controlling flow rates over that range of pressures which occur during beverage dispensing operations. However, flow washers do not appropriately compensate for another factor which contributes to variations in the accuracy of the mixing operation, or "brix". This factor is the change in fluid friction resulting from changes in viscosity of the mixed fluids. The syrup, in particular, has a viscosity that exhibits a very high dependance on temperature, and that undergoes significant changes during the normal environmental temperature variations that occur during soft drink dispensing.

When the fluid friction, or viscosity, of either fluid component (e.g., water or syrup) changes, an equal amount of applied pressure causes a different amount of that fluid component to flow, thereby changing the relative proportions of the dispensed fluids.

Some soft drink dispensing systems attempt to measure fluid flow rates with flowmeters in order to adjust the flow rates, and to maintain them in a prescribed ratio. Unfortunately, the same fluid viscosity variations that cause problems with controlling fluid flow with flow washers also cause problems with flowmeters.

Syrups commonly vary in viscosity from $\times 2$ to $\times 20$ over the range between 32° F. (0° C.) and 194° F. (90° C.). These large variations cause commensurate variations in the signal outputs of viscosity-sensitive flowmeters. Dispensing systems that are dependent upon such viscosity-sensitive flowmeters for regulating fluid flow to dispense (i) a prescribed mix ratio, and/or (ii) a predetermined volume, are correspondingly subject to undesirable error in measurement.

One previous system that attempts to provide accurate proportions of dispensed fluids despite variations in fluid pressure and/or fluid viscosity is shown in U.S. Pat. No. 4,487,333 for a FLUID DISPENSING SYSTEM. The system employs syrup and water flowmeters in order to monitor the instantaneous flow rates of both the water and fluid. Responsive to this monitoring, separate syrup and water valves are controllably turned on and off, each independently at an appropriate duty cycle, in order to provide a prescribed mix ratio. Fluid flow is sensed and controlled directed to minimize the effects of pressure variations in the syrup and water supplies, and permit dispensing of the water and syrup in accurate and constant proportion.

However, the flowmeters of this previous fluid dispensing system are sensitive to changes in the viscosity of the fluid for which flow is sensed. Accordingly, the system attempts to accommodate for variations in the relative proportion of water and syrup in the dispensed mix that result from changes in fluid viscosity. In order to do so, a temperature sensor is used to sense the temperature of the syrup. A microprocessor-based digital electronics control circuit receives this sensed temperature, as well as the sensed flow rate. The control circuit references a separate, removable, personality module for each particular type of syrup. The module contains information on both the prescribed mix ratio for that particular syrup and the dependence of the syrup's viscosity on changes in temperature. The control circuit uses this information to calculate the appropriate duty cycles that will control for pressure variations, and also for viscosity variations, in the dispensed syrup component.

This type of fluid dispensing system is generally complex and expensive. It performs its dispensing tasks using predetermined information that is stored in the removable personality module. The information typically includes mix ratios and viscosity characteristics of the syrup component. The contents of the personality module is customized for each type of syrup—often, a difficult task.

The fluid dispensing system of U.S. Pat. No. 4,487,333 operates to control fluid control fluid flow by cycling a solenoid valve on and off at a variable duty cycle. The cycling introduces unwanted noise and vibration into the system.

Prior Viscosity-Insensitive Flowmeters and Differential Pressure Flowmeters

Flowmeters that are substantially insensitive to changes in fluid viscosity presently exist. Some exhibit high accuracy in mixing, sufficient for use in beverage dispensing. Others do not. For example flowmeters of the wedge, pitot tube, and elbow meter types exhibit low sensitivity to fluid viscosity variations, but exhibit only medium accuracies on the order of ±3% to ±10% of full scale. Also, flowmeters of the Weir (V-notch) and Flume (Marshall) types exhibit low sensitivity to fluid viscosity variations but only medium accuracy. Accurate viscosity-insensitive flowmeters include electromagnetic, ultrasonic (doppler), ultrasonic (time-of-travel), mass (coriolis), and mass (thermal) types. Unfortunately, all these flowmeter types are very expensive.

A generally less expensive flowmeter of another type is the differential pressure flowmeter or variable-area flowmeter. However, variable-area flowmeters (also called rotameters) generally exhibit significant sensitivity to variations in fluid viscosity.

Given the above-mentioned limitations of various previous systems, it would be desirable to have a fluid dispensing system, particularly a system for the dispensing of soft drinks, that could be operated to mix and dispense fluids accurately at a prescribed mix ratio regardless of variations in the pressures or in the viscosities of the fluids. It would also be desirable to have an improved flowmeter, which is usable with a fluid dispensing system, that is also insensitive to variations in fluid viscosity and that provides high accuracy in mixing operations.

SUMMARY OF THE INVENTION

It has now been discovered that the pressure-sensing and variable channel-occluding functions of the float within a variable-area flowmeter, or rotameter, can beneficially be performed by separate, but mechanically connected, elements. These separate elements desirably differ considerably in (i) size, and (ii) orientation relative to both the direction of fluid flow and the viscosity-sensitive frictional forces imparted by the flowing fluid.

The present invention incorporates at least six principles (described subsequently). The same principles are capable of being manifest (i) in both flowmeters and flow regulators, and (ii) in many diverse embodiments of either flowmeters or flow regulators.

As an example of this diversity all embodiments of either flowmeters or flow regulators in accordance with the present invention are based on a housing defining a channel for flowing fluid between an inlet part and an outlet part. However, in some embodiments the separate pressure-sensing element is a flexible diaphragm, and in other embodiments it is a cylinder moving within a bore. The preferred pressure-sensing element is a flexible elastomeric diaphragm.

The separate, but mechanically connected, channel-occluding element may be, for example, either (i) a flange to the cylinder which flange operates as a slide valve to variably occlude a port through which fluid flows, or else (ii) a rod that is connected at its proximal end to the diaphragm for moving therewith in order to variably occlude with its distal end an orifice within the fluid flow channel. The channel-occluding element is preferably a rod.

A force-biasing element force biases the pressure-sensing element, and the channel-occluding element connected thereto, against the pressure force of the flowing fluid. The force-biasing element is typically a spring.

Still other embodiments are possible. All embodiments adhere to at least one, and preferably to several, of the separate and severable principles of the invention.

A first principle of the invention is that the channel-occluding element—which channel-occluding element experiences substantial viscosity-sensitive frictional forces from fluid flow—is made smaller, typically more than 20 times smaller and more typically a ratio of 100:1 smaller, than the differential-pressure-sensing element—which pressure-sensing element does not substantially experience any viscosity-sensitive frictional forces. The ratio of the pressure force exerted on the differential pressure-sensing element, or "pressure sensor", to the fluid frictional force exerted on the channel-occluding element, or "flow obstructor", approximately equals the ratio of the area of the pressure sensor to the area of the flow obstructor where it acts to variably occlude the channel. Because this ratio is very small—typically less than 1:20 and more typically 1:100—flowmeters and flow regulators so constructed exhibit substantial insensitivity to changes in fluid frictional forces due to changes in fluid viscosity.

For example, in certain embodiments of both flowmeters and flow regulators the preferred flexible elastomeric diaphragm pressure sensor is more than 20 times, and is normally 100 times, larger in the area over which it responds to pressure forces than is the distal end area of the preferred rod, connected at its proximal end to the diaphragm, that serves to variably occlude the channel flowing fluid.

A second principle of the invention is that the relatively larger pressure sensor, and preferably also (to such degree as is possible) the relatively smaller flow obstructor, are oriented relative to the flowing fluid so that frictional forces therefrom do not substantially couple into the motion that is undergone by these elements. Particularly in the case of the pressure sensor its movement is constrained to be very substantially perpendicular to the flowing fluid with which it (necessarily) comes in contact. Because the laws of mechanics preclude that a vector force can couple across a right angle, the pressure sensor, in particular, is substantially insensitive in its pressure-indicating motion to fluid frictional forces, or to any changes in these fluid frictional forces that are induced by changes in fluid viscosity. This spatial relationship is what supports the assertion in the second preceding paragraph that "the pressure-sensing element . . . does not substantially experience any viscosity-sensitive frictional forces".

For example, in certain embodiments of both flowmeters and flow regulators the typical flexible elastomeric diaphragm pressure-sensing element is positioned in the fluid channel so that the fluid flows substantially parallel along a one surface thereof. The diaphragm flexes in response to pressure changes in a direction substantially perpendicular to this flowing fluid, and to the major frictional forces exerted thereby. The pressure-indicating movement of the diaphragm is thus substantially insensitive to the major fluid frictional forces, and also, for the most part, to changes in fluid frictional forces that are induced by changes in fluid viscosity.

Alas, even a pressure sensor that moves at a right angle to the flowing fluid, and at right angles to the major frictional forces exerted thereby, will experience some, albeit minor, force changes resultant from changes in fluid viscosity. This is because a more viscous fluid does not flow past the pressure sensor as freely as a less viscous fluid, and causes a greater differential pressure to be sensed for an equal fluid flow rate.

In accordance with a third principle of the invention even these smaller, minor, viscosity-induced force changes within a flowmeter or flow regulator are correctly accounted for. As the third principle of the invention, viscosity-induced changes in the fluid frictional forces that are separately exerted on the separate (but connected) flow-obstructing and pressure-sensing elements of both flowmeters and flow regulators are coupled in a directional sense so as to induce force cancellation. The exactitude of this cancellation, or compensation, of the viscosity-induced force changes may even be promoted by adjusting the surface features and/or textures of either or both of the flow-obstructing or pressure-sensing elements so that the fluid forces experienced thereby are more substantially and exactingly offsetting over a broader operational range.

For example, in certain embodiments of flowmeters and flow regulators in accordance with the present invention the operative connection between the differential pressure sensor (typically the flexible diaphragm) and the flow obstructor (typically the rod) is directionally so that an increased/decreased fluid viscosity causing increased/decreased frictional force on the flow obstructor where it moves to variably occlude the channel acts mechanically oppositely to a change in static differential pressure force on the differential pressure sensor due to the same increased/decreased fluid viscosity. Thus mechanically oppositely-acting forces tend to cancel each other. The counteracting forces can even be empirically fine tuned by choice of the surface contours, material, or treatment of either the diaphragm and/or the rod.

Still further principles of the present invention are manifest predominantly in fluid flow regulators. The channel of a fluid flow regulator in accordance with the present invention has (i) a first, fixed size, orifice across which a differential pressure is sensed, and (ii) a second, variable-size, orifice through which fluid flow is controlled, or regulated. The size of the second orifice is varied by a variably occluding (rod, or pin) element that is mechanically connected to the differential pressure sensor for moving therewith against a fixed biasing force (exerted by the spring). The flow regulator functions so as to variably occlude the second orifice in accordance with the second flow-rate-dependent pressure drop across the first orifice. By this function the net fluid flow through the channel is held substantially constant (i.e., regulated), and is maintained at a set magnitude that is predetermined by the strength of the biasing force (the spring).

In accordance with a fourth principle of the present invention, a ratio of the area of the flow regulator's fixed-size first orifice to the area of its variable-size second orifice is no less than about 1:2 (the corresponding pressure ratio is no less than 1:4). This ratio establishes (i) a working range of about 2.5 psi to 20 psi and more normally 8 psi pressure drop across the diaphragm. Meanwhile (ii) the fluid flow pressure varies from 10 psi to 80 psi, and is most commonly about 32 psi.

One way of understanding these preferred ratios, and the pressure drops resultant therefrom, is to consider that the entire inlet pressure of the fluid source is commonly dropped across the flow regulator, and is particularly dropped across the fixed first and variable second orifices thereof. The inlet fluid pressure may commonly be in a range from 10 to 80 psi. Some pressure must necessarily be dropped across the fixed-size first orifice—which pressure drop is sensed by the differential pressure sensor—in order to provide a temporally responsive, and quantitatively accurate, indication of fluid flow. However, dropping too much pressure across the fixed-size first orifice, and relatively less pressure across the variable-size second orifice, will reduce the regulatory range. For an inlet fluid pressure of 10 psi to 80 psi it is preferable to drop approximately 2.5 psi to 20 psi across the fixed-size first orifice—which first pressure drop is detected by the pressure sensor—and the remaining 7.5 psi to 60 psi across the variable-size second orifice.

The preferred ratio of the area of the fixed-size first orifice to the area of the variable-size second orifice of a fluid flow regulator is unrelated to, and does not serve to establish, any ratio between the area of the occluding element and the area of the second aperture which it serves to variably occlude. In accordance with a fifth principle of the present invention, the ratio of the area of the second orifice (normally a round hole of approximately 1.5 mm diameter) to the area of its occluding rod, or pin, (normally a cylinder of approximately 0.5 mm diameter) is greater than 4:1, and is more commonly 9:1. By this ratio the fluid flow through a the second orifice when it is minimally occluded by the rod, or pin, registers a frictional force on this occluding rod, or pin, that is the substantial minimum practically achievable while still permitting reasonable (regulated) fluid flow rates on the order of ones to tens of liters per minute. The fifth principle recognizes that the occluding rod, or pin, must have some size (and must resultantly experience some frictional force) or else it will not be able to do its job. However, the size is desirably not too large relative to the second orifice which it acts to variably occlude.

In accordance with still another, sixth, principle of the invention the fixed-size first orifice is desirably located upstream from the variable-size second orifice—especially when gaseously-impregnated fluid (e.g., carbonated water) is flowing. This is because any outgassing from the gaseously-impregnated flowing fluid is disruptive to sensing differential pressure across the fixed-size first orifice with the pressure sensor, and thus to the accuracy of flow regulation. Avoidance of outgassing requires that pressures on both sides of the differential pressure sensor should be as high as is reasonably possible. Accordingly, the differential pressure sensor (and the fixed-size first orifice across which the differential pressure sensor is connected) are preferably located upstream—and therefore across a pressure that typically drops from 80 psi to 60 psi—instead of downstream—and therefore across a pressure that typically drops from 20 psi to an approximately 0 psi outlet pressure.

Flow regulators in accordance with the present invention that combine the principles one through six are both self-compensating and accurate, typically to within 1%, over a broad operational range of (i) fluid pressures, typically from 10 psi to 80 psi, (ii) fluid flow rates, typically from ones to tens of liters per minute, and (iii) fluid viscosities, typically up to 20:1.

Still further principles are within the invention. For example, there is preferably an abundant area of immediate contact between the pressure sensor and the flowing fluid so that the response time of a flowmeter or flow regulator employing such pressure sensor is very fast. The response time is typically so fast so as to be sensitive to hydrodynamical shock waves of less than one second rise time.

Accordingly, one preferred embodiment of the present invention is a fluid flow regulator having (i) a housing defining a channel for transporting a flowing fluid from an inlet where the fluid is at an inlet fluid pressure to an outlet where the fluid is at an outlet fluid pressure that is less than the inlet fluid pressure. The housing's channel has a first constricted region that restricts fluid flow. Across this first constricted region the fluid pressure incurs a first pressure drop. The housing's channel further has a second constricted region that also restricts fluid flow. Across this second constricted region the fluid pressure incurs a second pressure drop. The sum of the first pressure drop and the second pressure drop substantially equals the total pressure drop between the inlet fluid pressure and the outlet fluid pressure.

The fluid flow regulator further includes (ii) a differential pressure sensor located within the housing's channel so as to experience the first pressure drop across the channel's first constricted region. This differential pressure sensor moves dimensionally in response to the first pressure drop.

The fluid flow regulator still further includes (iii) a flow obstructor mechanically connected to the differential pressure sensor for moving therewith in order to variably occlude the housing's channel at its second constricted region.

Finally, the fluid flow regulator includes (iv) a force biasing means operating between the housing and both of the mechanically-connected pressure sensor and flow obstructor. The force biasing means exerts a constant force against the movement of the differential pressure sensor in response to the first pressure drop, and against the flow obstructor in a direction so as to cause it to less substantially obstruct the channel's second constricted region.

The differential pressure sensor is commonly a diaphragm, the flow obstructor is commonly a rod, and the force biasing means is commonly a spring.

As a manifestation of the first principle of the invention, the area of the differential pressure sensor that is subject to, and responsive to, the first pressure drop is more than twenty times, and is typically one hundred times, larger than an area of the flow obstructor that is subject to the frictional force from the flowing fluid where such flow obstructor acts to variably occlude the channel's second constricted region. Because the ratio of the pressure force exerted on the pressure sensor to the frictional force exerted on the first flow obstructor approximately equals the ratio of the area of the pressure sensor to the area of the first flow obstructor, and is thus greater than twenty, the detected flow rate is substantially insensitive to changes in fluid frictional forces resulting from changes in fluid viscosity.

As a manifestation of the second principle of the invention, the differential pressure sensor, which is flow connected to the flowing fluid at locations upstream and downstream of the channel's first constricted region, moves in response to the difference in static pressure between the upstream and downstream locations, defined as the first pressure drop. Meanwhile the flowing fluid at least one of the upstream and downstream locations is flowing over the same differential pressure sensor in a direction that is substantially perpendicular to the direction of its motion. Because, by the laws of mechanics, any frictional forces exerted by the flowing fluid against the pressure sensor cannot be coupled across a right angle into its movement, the pressure sensor is substantially insensitive to both (i) fluid friction, and (ii) any changes in fluid friction.

As a manifestation of the third principle of the invention, the operative connection between the differential pressure sensor and the flow obstructor is directionally so that (i) a viscosity-induced change in fluid frictional force on the flow obstructor where it moves to variably occlude the channel will act mechanically oppositely to (ii) a change in a static differential pressure force on the differential pressure sensor resultant from the same change in viscosity. Because the mechanically oppositely-acting forces tend to cancel each other, the flow regulator is still further substantially insensitive to those changes in fluid frictional forces that result from fluid viscosity changes.

As a manifestation of the fourth principle of the present invention, the ratio of the size of the channel's second constricted region to the size of the channel's first constricted region is greater than 2:1, and is more commonly about 4:1.

As a manifestation of the fifth principle of the invention, the ratio of the area of the channel's second constricted region to the area of the flow obstructor where it operates to variably occlude the channel's second region is greater than 4:1, and is more commonly about 9:1.

As a manifestation of the sixth principle of the invention, the channel's first constricted region is upstream of the channel's second constricted region.

Both flowmeters and flow regulators in accordance with the present invention may be considered to be very exactingly force-analyzed by comparison with the prior art. Although assuming many embodiments, they are constructed in accordance with certain principles that have been derived from such analysis of forces.

Particular flowmeters and flow regulators constructed in accordance with the several principles of the invention are typically accurate to indicate (in the case of flowmeters), or to mechanically regulate (in the case of flow regulators), fluid flow to an accuracy of 1% over a broad range of flow rates, flow pressures, and fluid viscosities. For example, in one appropriately-sized and biased embodiment of a flow regulator in accordance with the present invention 100% mechanical flow regulation is typically obtainable to better than 1% accuracy for a fluid undergoing ×20 variations in viscosity at flow rates of ones to tens of liters per minute at 10 psi to 80 psi pressure.

Accordingly, flowmeters and flow regulators in accordance with the invention are imminently suitable for post-mix soft drink dispensing applications, for which applications they may be up to an order of magnitude less expensive than prior devices and systems.

These and other attributes and aspects of the present invention will become increasingly clear on reference to the following specification and accompanying drawings.

BRIEF DESCRIPTION OF THE DRAWINGS

FIG. 3b is a diagrammatic view of a plunger and sleeve that are interoperative to variably occlude a fluid flow aperture within that second embodiment of a variable-area flowmeter in accordance with the present invention previously shown in FIG. 3a.

DETAILED DESCRIPTION OF THE INVENTION

Figure 1:
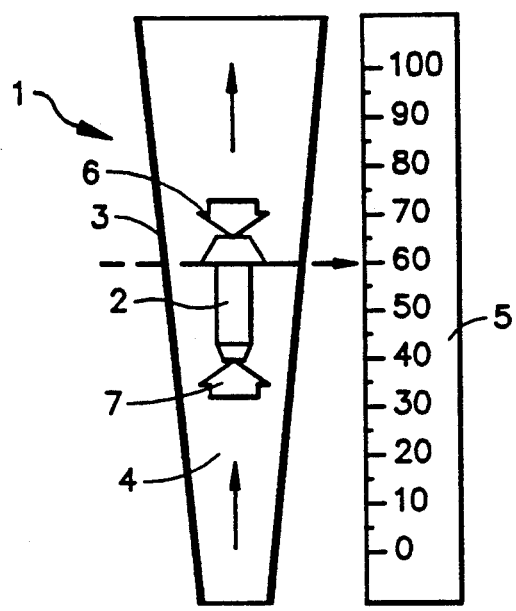
FIG. 1 is a diagrammatic view showing a previous variable-area flowmeter, or rotameter.

The present invention is based on the insight that the pressure-sensing and the variable-channel-area-occluding functions of the float within a variable-area flowmeter, or rotameter, are separate and severable, and are advantageously performed by separate, but connected, physical structures. The present invention is further based on analysis, and understanding, of all the fluid frictional forces present within a mechanical flow regulator, and, resultantly to such analysis and understanding, the interconnection of elements within the regulator so that either the absolute level of fluid frictional forces, or changes in this level, such as tend to cause regulation error will be (i) avoided (minimized) and/or (ii) compensated (cancelled).

The pressure-sensing function within both flowmeters and flow regulators in accordance with the present invention is desirably performed by a pressure sensor that is substantially insensitive to changes in fluid viscosity. Meanwhile, a variable-channel-area-occluding function performed in both the flowmeters and flow regulators is implemented by a flow obstructor, connected to the pressure sensor for moving therewith, that is, unfortunately and uneliminatably, substantially sensitive to changes in fluid viscosity.

In accordance with a first principle of the present invention the viscosity-insensitive pressure sensor exhibits a large area relative to the area of the viscosity-sensitive flow obstructor. Flowmeters and flow regulators so constructed exhibit an overall sensitivity to changes in fluid friction due to changes in fluid viscosity that is in proportion to the ratio of the area of the flow obstructor to the area of the pressure sensor. This ratio can be made very small, and flowmeter, and flow regulators in accordance with the present invention can correspondingly be made to be substantially insensitive to changes in fluid viscosity.

Accordingly, errors due to viscosity-induced changes in fluid frictional forces are not eliminated in the flowmeters and flow regulators of the present invention, but such errors are substantially minimized.

Avoidance of the effects of viscosity-change-induced errors in flow rate measurement and regulation does nothing to account for changes in fluid frictional forces when a fluid, which may be of a constant viscosity, flows faster or slower under higher or lower pressures. Avoidance of rate sensing (in the case of a flowmeter, or regulation (in the case of a flow regulator), errors when the fluid velocity, and the attendant fluid frictional forces, are changed requires compensation, preferably in the form of mechanical force cancellation, and not just force avoidance, or minimization.

In preferred embodiments of variable-area flowmeters and flow regulators in accordance with the present invention a housing defines a channel for fluid flowing from an upstream to a downstream location. A differential pressure sensor is flow connected between the upstream and the downstream locations for moving in a direction substantially perpendicular to the flowing fluid in response to the static pressure differential between these locations. Because the movement of the differential pressure sensor is perpendicular to the fluid flow, the laws of mechanics make the movement of the pressure sensor substantially insensitive to frictional forces of the flowing fluid. Because of its substantial insensitivity to fluid frictional forces, the pressure sensor is likewise substantially insensitive to changes in fluid frictional forces resulting from changes in fluid viscosity.

A first flow obstructor is connected to the pressure sensor for moving therewith in order to variably occlude the housing's channel, and the flow of fluid from the upstream to the downstream locations. The fluid flowing past the first flow obstructor imparts frictional forces to its movement. Those fluid frictional forces change with changes in fluid viscosity. Accordingly, the movement of the first flow obstructor is sensitive to changes in fluid viscosity—unlike the movement of the pressure sensor to which it is connected.

A biasing means, normally a spring, operates between the housing and the connected pressure sensor and first flow obstructor. The biasing means force biases the first flow obstructor to various positions occluding fluid flow within the channel so that the differential pressure sensed by the pressure sensor will continually remain, during various rates of fluid flow, at a constant, predetermined, level.

The movement of the connected differential pressure sensor and first flow obstructor is indicative of the rate of fluid flow, forming thereby a variable-area flowmeter.

In variable-area flowmeters and flow regulators in accordance with the present invention the ratio of the pressure force exerted on the differential pressure sensor to the fluid frictional forces exerted on the first flow obstructor approximately equals the ratio of the area of the pressure sensor to the area of the first flow obstructor. The area of the first flow obstructor is normally made quite small, typically less than 1%, relative to the area of the pressure sensor. Accordingly such flowmeters and flow regulators exhibit substantial overall insensitivity to changes in fluid friction due to changes in fluid viscosity.

Typically flowmeters and flow regulators in accordance with the present invention will exhibit inaccuracies in flow measurement of less than ±1% responsive to changes on the order of times twenty ($\times 20$) in fluid viscosity.

Once the principle of the present invention to separate the (i) differential-pressure-sensing and (ii) flow-area-occluding functions of variable-area flowmeters and flow regulators is recognized then it is readily possible to construct a large number of flowmeters and flow regulators that do not substantially resemble one another but that, in their fundamental operation, embody the same operational principle.

The differential pressure sensor may be, in different embodiments of the invention, either a diaphragm or a plunger that moves within a complementary cavity. The upstream and downstream fluid pressures are flow communicated to opposite sides of the diaphragm, or the plunger, as the case may be.

A force biasing means operative between the differential pressure sensor and the housing of the flowmeter or flow regulator is typically a spring. The force biasing may also be provided by the weight of a properly oriented moving element of a differential pressure sensor, such as the weight of a plunger that moves vertically within a cavity. The force biasing means, howsoever constituted, opposes the movement that the differential pressure sensor undergoes in response to changes in differential fluid pressure.

The flow obstructor that is connected to the differential pressure sensor for moving therewith in order to variably occlude the channel and to variably obstruct the flow of fluid between the upstream and downstream locations may likewise assume different forms. If the differential pressure sensor is a diaphragm then the flow obstructor is normally a simple rod attached to the diaphragm so as to move between greater and lesser proximity to an orifice within the channel in order to variably occlude the fluid flow. The operative region of the rod is preferably of complementary shape to the channel's orifice.

If the flow sensor is a plunger then the fluid obstructor is normally an apertured flange on the plunger body which moves along with the plunger body, similarly to a sliding valve, to variably occlude an orifice in the channel. The aperture of the plunger's flange is preferably triangular in shape in order that the cross-section of the obstructed opening is proportional to the square of such movement.

Each differential pressure sensor, and its attached flow obstructor, moves so that, for any one fluid flow rate, the combined force of flowing fluid on the fluid obstructor, and on the differential pressure sensor, will equal the force exerted by the force biasing means to the displacement of the differential pressure sensor, and of the flow obstructor connected thereto, that is resultant from this one flow rate.

The magnitude of fluid flow—which determines the displacement of the differential pressure sensor and the fluid flow obstructor attached thereto—may be indicated visually, or by a mechanical connection, or by, as is preferable, an electrical circuit. One preferred electrical circuit to detect the movement of the differential pressure sensor is a linear displacement transducer. The linear displacement transducer works by sensing the movement of a coil element in an electromagnetic field. The electromagnetic field is preferably generated by an alternating current energization of an inductive coil.

The present invention may be embodied in variable-area mechanical flow regulators. Such flow regulators typically exhibit low sensitivity to changes in fluid friction and fluid viscosity. In one preferred embodiment of a viscosity-insensitive flow regulator a second flow obstructor is connected to both the differential pressure sensor and to the original, first, flow obstructor for moving therewith. The second flow obstructor is thus force biased in its movement by the same spring that biases the differential pressure sensor and the original, first, flow obstructor. The second flow obstructor variably occludes the flow of fluid from that same downstream location that is flow connected to the differential pressure sensor to another, still further downstream, location.

The movement of the second flow obstructor is so that the fluid flow to the further downstream location is reduced if a fluid flow higher than a predetermined flow rate is indicated by movement of the differential pressure sensor, and is increased if a fluid flow lower than the predetermined flow rate is indicated by the opposite movement of the same differential pressure sensor. The strength of the force biasing spring is normally mechanically adjustable in order to set the predetermined flow rate. The predetermined flow rate will thereafter be substantially maintained regardless of changes in fluid pressure and/or viscosity.

In operation the force of gravity 6 bears down on float 2 while the flow pressure 7 of the fluid 4 presses up on the same float 2. When there is no flow of fluid 4, the float 2 rests freely at a rest location (numerical "0" on scale 5) at the bottom of tapered tube 3. As liquid 4 enters the bottom of the tube the float 2 begins to rise. The position of float 2 varies directly with the flow rate. Its exact position is at a point where the differential pressure between its upper and lower surfaces exactly balances the weight of the float 2.

The movement of float 2 in the variable-area flowmeter 1 serves two functions. The float 2 is responsive to a differential pressure caused by the flowing fluid 4 between its upper and lower surfaces. The movement of float 2 also opens up a relatively greater, or lesser, cross-sectional area of the tapered tube 3 to accommodate the flow of fluid 4 around the float 2. It should be noted that the exposed cross-sectional area between tapered tube 3 and float 2 is proportional to the square of the linear movement of the float.

Figure 2:
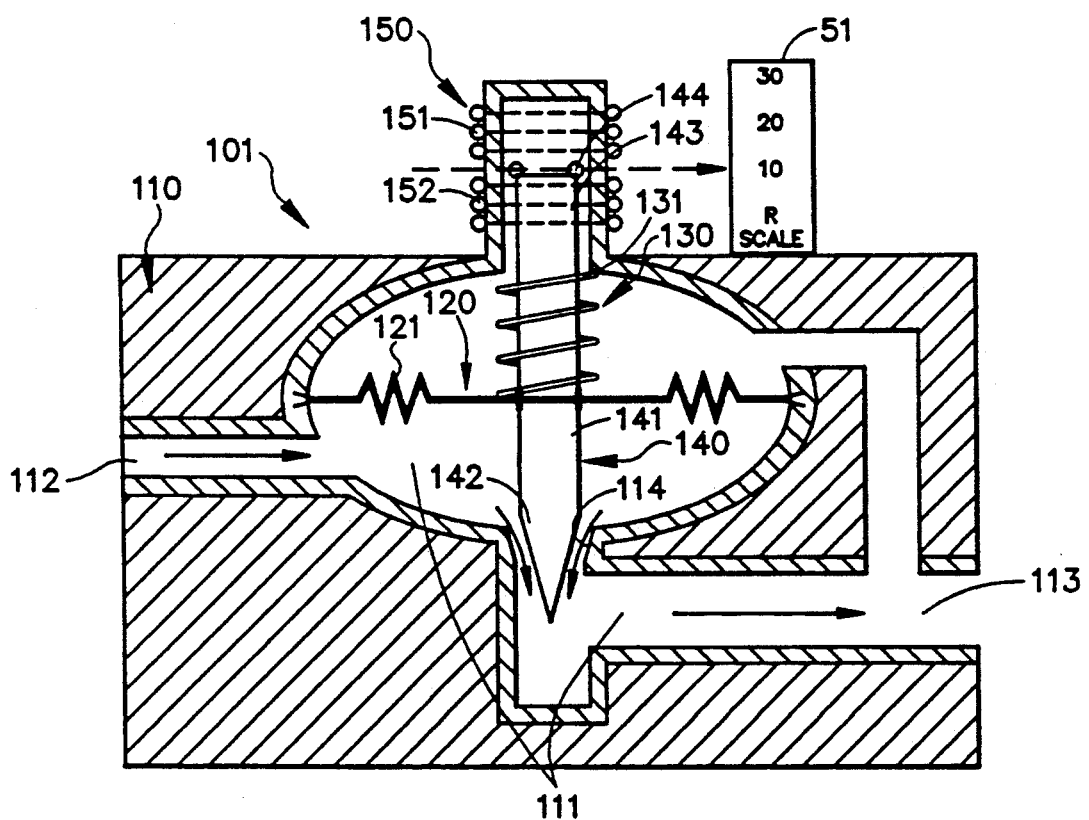
FIG. 2 is a cutaway view of a first embodiment of a variable-area flowmeter in accordance with the present invention.

Two preferred embodiments of a variable-area flowmeter in accordance with the present invention are shown in FIGS. 2 and 3. In both embodiments, the differential-pressure-sensing and the variable-occluding functions of the flowmeter are separated. The separation, and a high ratio of the area of the pressure sensor to the area of the flow obstructor, permits flowmeter operation with substantial insensitivity to changes in fluid friction and/or fluid viscosity. Although the two illustrated embodiments appear markedly physically dissimilar, they are both based on the same principle.

In the first embodiment of a variable-area flowmeter 101 shown in FIG. 2, a housing 110 defines a channel 111 between an upstream location 112 and a downstream location 113. The channel 111 presents an aperture 114 between its upstream location 112 and its downstream location 113. Aperture 114 need not be of any special size or configuration relative to other regions of channel 111. It simply represents a region where the channel will be variably occluded, as hereinafter explained. The aperture 114 can be, for example, configured in annular form similarly to the tapered seat of a valve.

A differential pressure sensor 120, constructed in the form of a flexible diaphragm 121, is positioned within housing 110. The diaphragm 121 is flow connected to the upstream location 112 of channel 111 on a one side and to the downstream location 113 of the same channel 111 on its opposite side. The diaphragm 121 is force biased in its position responsive to the differential pressure between upstream location 112 and downstream location 113 by force biasing means 130, typically a spring 131.

A flow obstructor 140, typically in the form of member or rod 141, is connected to the diaphragm 121 for moving therewith. The rod 141 moves from greater or lesser proximity to the aperture 114 within channel 111 in order to variably occlude the channel 111 and to variably obstruct the flow of fluid upstream location 112 to downstream location 113. The distal end region 142 of rod 141 is of complementary shape—normally circular—and configuration—normally presenting a conical taper—to the circular aperture 114 within the channel 111 of housing 110. The proximal end 143 to rod 141 may be made visible through housing 110, which is typically made of clear plastic in the region surrounding this proximal end region 143, as an indicator of flow. The position of proximal end region 143 may be visually referenced relative to scale 51, normally calibrated in units of choice, as an indication of the quantitative flow rate.

The rod 141 preferably mounts an electrically conductive feature 144, normally a copper coil, at its proximal end region 143. The movement of this electrically conductive feature 144 relative to coil 150 that is wrapped around the exterior of housing 110 near the proximal end region 143 of rod 141 permits the electrical sensing of the displacement of rod 141 and diaphragm 121. In particular, the coil 150 is normally energized in its upper half 151 and its oppositely wound lower half 152 with alternating current. The amount of inductive coupling between the two regions 151, 152 will be a function of the position of electrically conductive feature 144. This coupling may be sensed by commonly understood electrical circuits such as the well-known linear displacement transducer.

During operation of the first embodiment of the variable-area flowmeter 101, a neutral spatial position of diaphragm 121 is established by the spring 131 during the presence of a predetermined pressure difference between upstream location 112 and downstream location 113 within channel 111 of housing 110. This force biasing of spring 131 typically causes the rod 141 to be positioned so as to make the area of fluid flow at the position of aperture 114 to be greater than zero, but less than maximum. During operation of the flowmeter 101, the force of flowing fluid in channel 111 acting on diaphragm 121 and on rod 141 connected thereto equals the force exerted by the spring 131. The spring effectively produces a linear force in response to its compression or distension over the operative region of interest. Accordingly, the magnitude of the movement of the diaphragm 121 and of the rod 141 connected thereto will be indicative of the fluid flow rate in channel 111, and will typically be linearly indicative of such fluid flow rate.

In operation, the diaphragm 131 moves perpendicular to the flow of fluid in channel 111. Because the fluid frictional forces, and the changes in these fluid frictional forces due to changes in fluid viscosity, cannot couple to a perpendicular axis by the laws of mechanics, the diaphragm 121 exhibits a substantial insensitivity to changes in fluid friction and/or fluid viscosity. The diaphragm 121 is preferably located to one side of the fluid flow within channel 111 so that fluid flows substantially parallely, and not transversely, across one major surface of the diaphragm. Although the flow of fluid across the face of the diaphragm 121 may exhibit friction, this friction does not substantially contribute to the displacement undergone by diaphragm 121. The displacement of diaphragm 121 is almost purely a function of differential pressure in the flowing fluid.

Meanwhile, the rod 141 also exhibits friction with the fluid flowing within channel 111, especially at its distal end region 142. This friction is in a direction in which the rod 141, and the diaphragm 121 connected thereto, moves. Accordingly, to the extent of the fluid friction experienced by rod 141 both it, and the connected diaphragm 121, are sensitive to changes in fluid friction and/or fluid viscosity. However, the amount of friction experienced by rod 141 is relatively smaller—because of the relatively smaller area size of rod 141 relative to diaphragm 121—than was the case for the combined-function float 2 within the prior art flowmeter shown in FIG. 1.

In particular, the ratio of the pressure force exerted on diaphragm 121 to the fluid frictional force exerted on rod 141 is substantially equal to the ratio of the area of the diaphragm 121 relative to the area of the rod 141. In accordance with the present invention, both ratios are made high, typically on the order of 100:1. The flowmeter 300 will accordingly exhibit less than 1% inaccuracy due to gross changes in fluid friction resulting from changes in fluid viscosity.

The viscosity-insensitivity of the flowmeter 301 (and of the alternative embodiment flowmeter 201 shown in FIG. 3) may easily be measured quantitatively. A finely graduated measuring container, such as the "standard measuring cup" used in calibrating post mix soft drink dispensers is used. A liquid, such as a soft drink syrup, is controlled, normally by an electronic flow control circuit that adjusts a flow control value in accordance with the signal developed by coil 150 of flowmeter 301, to flow at a set rate. The volume accumulation of the liquid after a set period of several seconds is compared when the liquid is at 0° C. (immersed in ice) and when it is at 90° C. (nearly boiling). The viscosity of a typical soft drink syrup will vary by greater than a factor of twenty ($\times 20$) between these temperature extremes. For the identical indicated flow rate of flowmeter 301 the flow accumulations after identical periods of time will differ by less than 1%. Accordingly, the effect on the indication of flowmeter 301 due to viscosity variations on the order of $\times 20$ in the flowing fluid is less than 1%.

Moreover, and further considering the structure of flowmeter 101, the manner in which changes in fluid friction and/or viscosity operate on rod 141, and on variable-area flowmeter 101, actually serves to cancel the net effect of any such changes. Mainly, a fluid flow within channel 111 that is of higher friction, and more viscous, will exert a greater frictional drag upon rod 141 and tend to force it downwards into aperture 114, thereby increasingly occluding the flow of fluid within channel 111. Meanwhile, the same higher friction and higher viscosity fluid flow will cause a higher differential pressure to be seen by diaphragm 121, forcing such diaphragm upwards. The same change in viscosity is thus to an extent self-cancelling in its effects. The flowmeter 101 in accordance with the present invention can actually be fine tuned by a choice of the material or surface treatment of rod 141, and of the area of diaphragm 121, so as to account for the second order effects of viscosity variation over an operational range of interest.

In summary, the variable-area flowmeter 101 exhibits, by virtue of its viscosity-insensitive differential pressure sensor 120 which is of a relatively larger area in combination with its friction- and viscosity-sensitive flow obstructor 140 which is of relatively smaller area, a substantial net low sensitivity to changes in fluid friction and/or fluid viscosity. As well as having this innate substantial insensitivity, the internal frictions that are experienced within the variable-area flowmeter 101 may actually be adjusted so as to be offsetting, or compensating, with changes in the friction or viscosity of the flowing fluid. The viscosity-insensitive variable-area flowmeter 101 exhibits, as an example of its application, an accuracy of better than 99% in the determination of flow rate for a soft drink syrup concentrate that varies in temperature from near 0° C. freezing (high viscosity) to nearly 90° C. (low viscosity). Although the quantative performance of flowmeter 101 to fluids of varying viscosity is dependent upon its exact construction configuration, and also on the particular materials used, it has been empirically demonstrated that variations in fluid friction and viscosity of the order of $\times 20$ cause less than 1% deviation in the flow rate that will be indicated by the flowmeter 101 for the same identical actual flow rates.

Figure 3A:
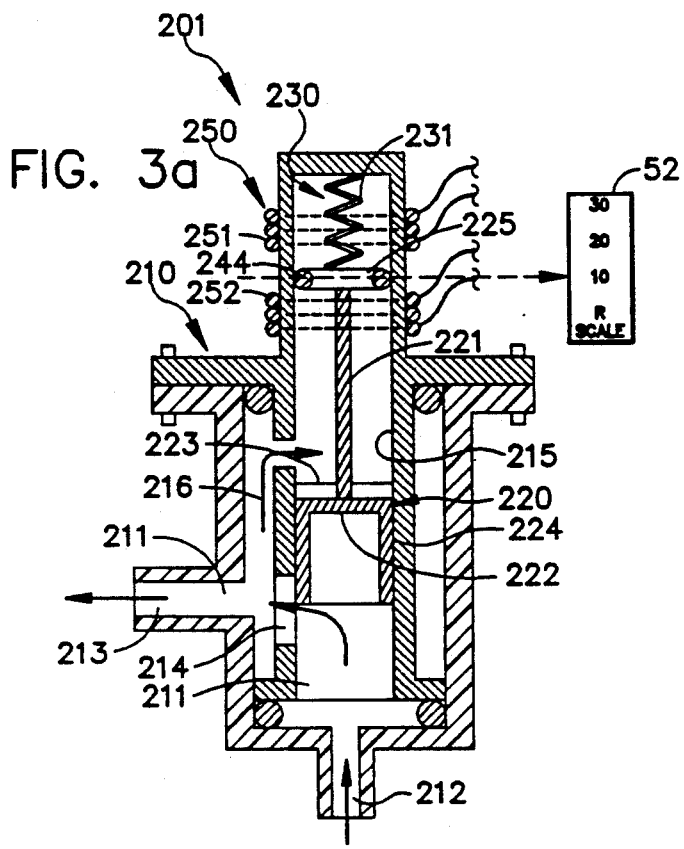
FIG. 3a is a cutaway view of a second embodiment of a variable-area flowmeter in accordance with the present invention.
Figure 3B:
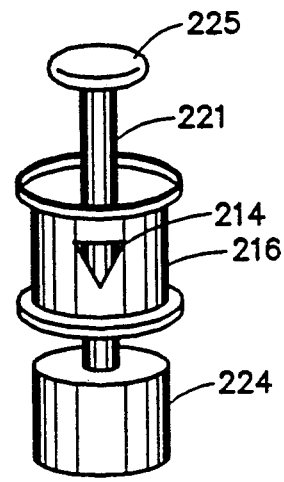

A second embodiment of a variable-area flowmeter in accordance with the present invention is shown in FIG. 3, consisting of FIG. 3a and FIG. 3b. The variable-area flowmeter 201 is considerably different in appearance from the variable-area flowmeter 101, but operates on equivalent principles. A housing 210 defines a channel 211 between an upstream location 212 and a downstream location 213. Between the upstream location 212 and the downstream location 213 there is an aperture 214 which may be variably occluded, in a manner to be explained, to obstruct the flow of fluid within the channel 211.

The differential pressure sensor 220 is embodied in a plunger 220 that is shown in perspective view in FIG. 3b. The plunger 220 moves in a cavity 215, normally a cylindrical bore, of housing 210. The distal end region 222 of the plunger 220 is exposed to the upstream fluid pressure of upstream location 212. The fluid pressure at downstream location 213 is ported via aperture 216 of housing 210 to the opposite, proximal end side 223, of plunger 220. The differential pressure seen between the distal end surface 222 and the proximal end surface 223 of plunger 220 causes it to move against the force of a force biasing means 230, typically a spring 231, within the cavity 215 of housing 210.

Although the force biasing means 230 in the second preferred embodiment of the variable-area flowmeter 201 is preferably a spring 231, it is possible to perform this force biasing by orienting the mass of plunger 220 in a substantially vertical cavity 215 of housing 210.

The flange 224 of plunger 220 is interoperative with the aperture 214 within sleeve portion 216 of housing 210 to variably occlude the flow of liquid within the channel 211. In FIG. 3b it is illustrated that the aperture 214 is within the sleeve portion 216 of the housing 210. The flange 224 of plunger 220 operates to variably occlude this aperture. Conversely, it will be understood that an aperture could have been positioned within the flange 224 to the plunger 220 which could be interoperative with a larger aperture within the sleeve region 216 of housing 210 to equivalently obstruct the fluid flow within channel 211.

In accordance with the present invention, the aperture 214 within housing 210, or its alternative equivalent within the flange 224 of plunger 220, is preferably triangular in shape. This particular shape provides that the change of the area of channel 211 at the location of aperture 14 will be proportional to the square of the movement of plunger 220. This triangular shape of the aperture thereby makes the response exhibited by the second embodiment of the variable-area flowmeter 201 shown in FIG. 3 with increasing flow rate equivalent to the response of the prior art flowmeter 1 shown in FIG. 1, and also to the response of the first embodiment variable-area flowmeter 110 shown in FIG. 2. The pressure differential is directly proportional to the square of the flow. The movement of the pressure sensor is directly proportional to the flow rate, giving a linear flowmeter.

It should be understood that aperture 214 could assume other shapes than that of an equilateral triangle. If, for example, the aperture was configured as a simple rectangle or square, then the change of flow cross-sectional area would be linear with movement. A triangle of nonequilateral shape, or other, complex, shapes for aperture 214 could be envisioned. Generally, it is possible to create an aperture 214 so that the movement equals any desired function of flow, movement m equals a function of flow, m=f(flow). Likewise, the change of flow cross-sectional area can be made to be any desired function of the opening area OA, OA=G (f(flow)). Finally, the pressure differential P is proportional to the square of the flow. Therefore $P=G (f(flow))^2$.

Generally, the second embodiment of the variable-area flowmeter 201 is constructed with a triangular aperture 214 so as to be linearly indicating. The linear movement of the flange 224 to plunger 220 causes an identical movement of proximal end extension 225 of plunger 220 by action of shaft 221. Such indication may be visual by viewing the location of the proximal end extension 225 to plunger 220, including viewing its location relative to scale 52. Such indication may be electrical by sensing the position of electrically conductive element 244, typically a simple copper loop, with external inductive coil 250. As in the first embodiment variable-area flowmeter 101 shown in FIG. 2, the energization of upper and lower segments 251, 252 of electrical coil 250 is normally with an alternating current. It forms a linear displacement transducer.

Still other means of sensing the position of the rod 141 shown in FIG. 2, and the plunger 221 shown in FIG. 3, will be obvious to a practitioner of the mechanical arts. The movement of such elements could cause, for example, the movement of a pointer against a dial scale by a suitable mechanical linkage.

Thus, in one embodiment, a variable-area flowmeter of the present invention comprises a housing containing a differential pressure sensor, a first flow obstructor and a biasing means. The housing defines a channel for transporting a flowing fluid in a direction from an upstream location to a downstream location. The differential pressure sensor is flow connected, between the fluid flow channel's upstream and downstream locations, for moving in a manner substantially perpendicular to the direction of the fluid flow. Movement of the sensor is in response to any static differential pressure present between the upstream and downstream locations.

The first flow obstructor is connected to the pressure sensor for (i) moving with the sensor to variable occlude the channel between the upstream and downstream locations, and (ii) receiving frictional force from the flowing fluid in the direction of the first flow obstructor's movement.

The biasing means operates between the housing and both the connected pressure sensor and first flow obstructor, for biasing the first flow obstructor to a position occluding fluid flow within the channel so that the differential pressure sensed by the sensor remains at a constant, preselected level.

The movement of the differential pressure sensor is indicative of the rate of fluid flow thereby forming a flowmeter.

Figure 4:
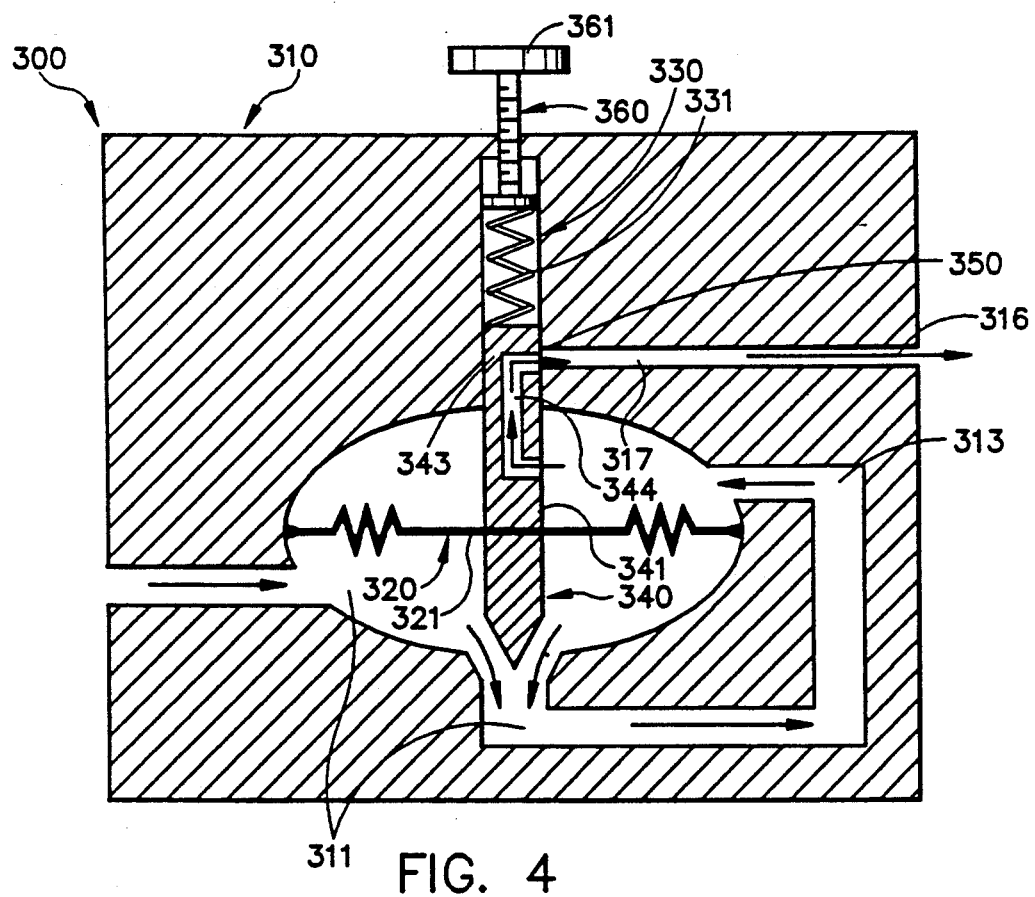
FIG. 4 is a cutaway view of a first embodiment fluid flow regulator in accordance with the present invention.
Figure 5:
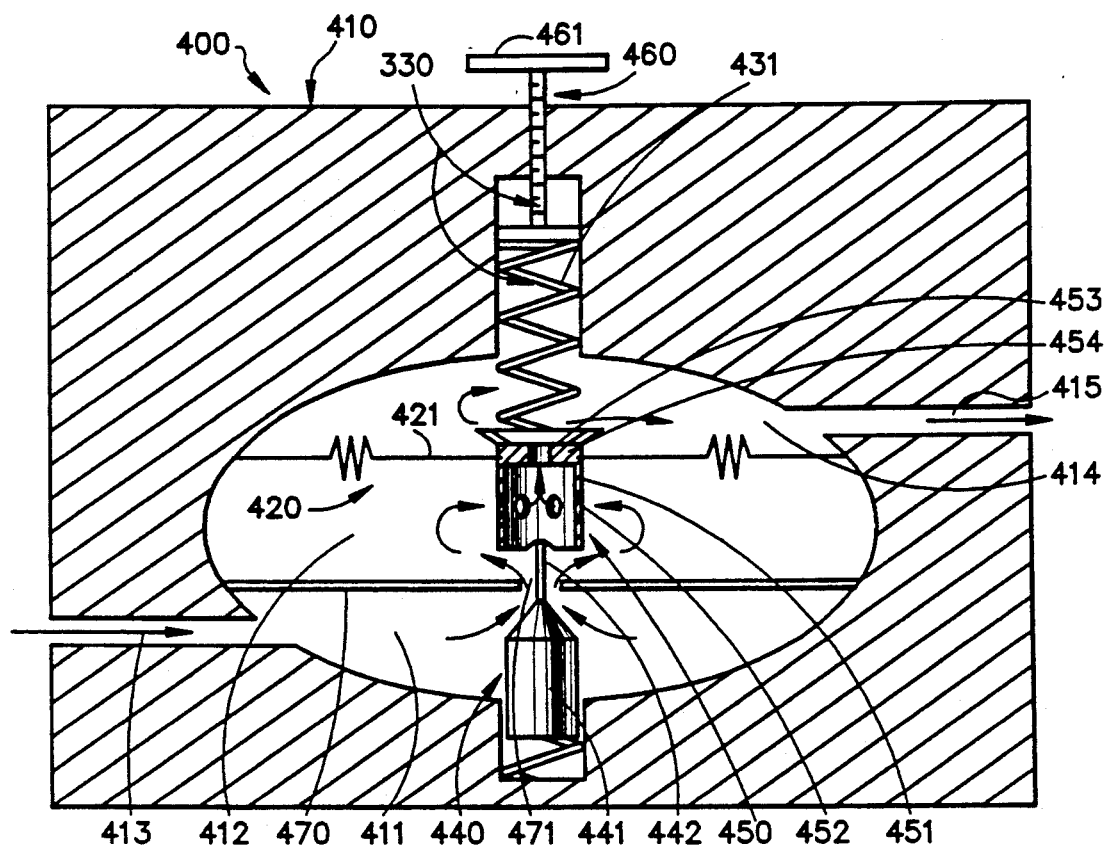
FIG. 5 is a cutaway view of a second embodiment of a fluid flow regulator in accordance with the present invention.
Figure 6:
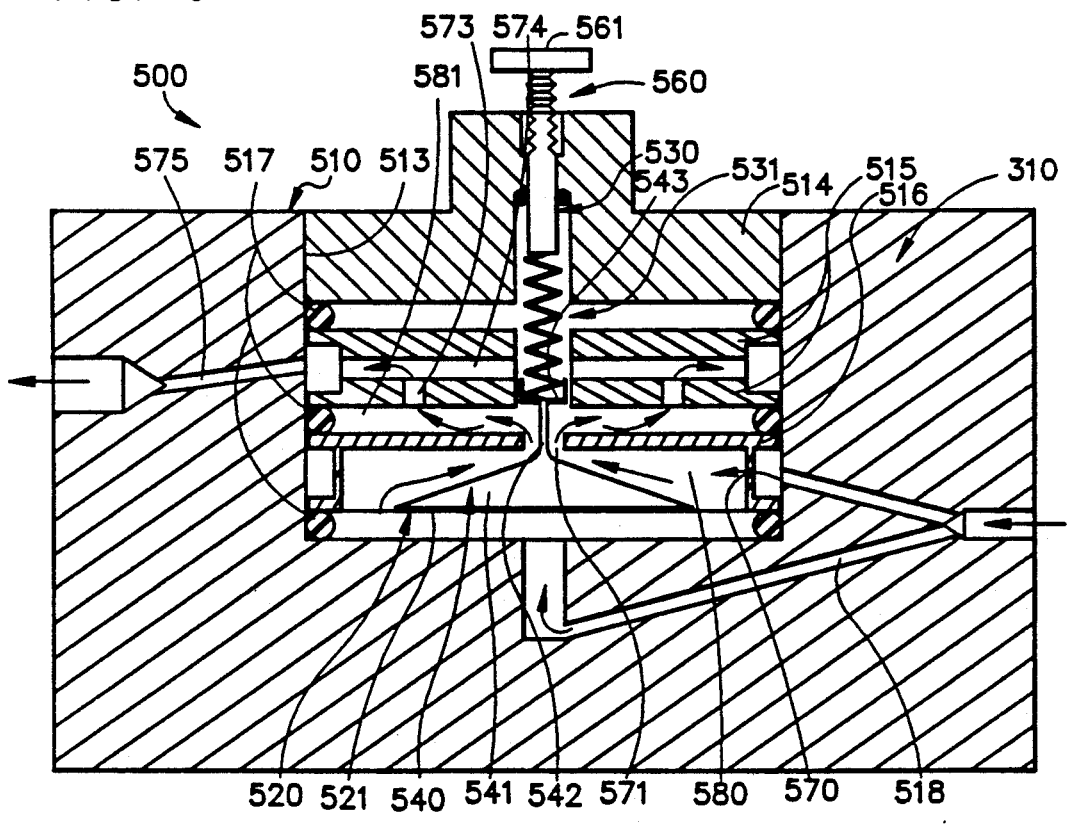
FIG. 6 is a cutaway view of a third, preferred, embodiment of a fluid flow regulator in accordance with the present invention.

Applications of the principles of the present invention in substantially viscosity-insensitive flow regulators are shown in FIGS. 4–6. The first embodiment of a flow regulator 300 shown in FIG. 4 includes a housing 310, a differential pressure sensor 320, a force biasing means 330, and a flow obstructor 340—each similar to the first embodiment variable-area flowmeter 110 shown in FIG. 2. The differential pressure sensor is preferably a diaphragm and the flow obstructor is preferably a member, or rod.

The downstream location 313 to the fluid flow along channel 311 is ported to the low pressure side of diaphragm 321. However, this downstream location 313 is further connected through additional, second, flow obstruction means 350 to another, further, downstream location 316. The additional, second, flow obstructor 350 may be based, among other configurations, on registration of a channel 344 within the proximal end region 343 of member, or rod, 341 with a channel 317 within the housing 310. When the member, or rod, 341 moves upwards, under force of an increased flow causing an increased differential pressure to be seen across diaphragm 321, then the flow obstruction produced by the second flow obstructor 350 is diminished, tending to reduce the flow to the original rate so as to restore the original differential pressure. Conversely, when a reduced differential pressure is seen across diaphragm 321 then the movement of channel 344 within member, or rod 341 relative to channel 317 within housing 310 will tend to cause an increased pressure across diaphragm 321, restoring the normal level of flow.

A set screw 360, typically turned by a knurled knob 361, may be used to adjust the strength of force biasing means 330 (spring 331), and thus the normal rate of flow.

It should be understood that the pressure differential seen across the differential pressure sensor 320 in the flow regulator 300 shown in FIG. 4 is not the same high pressure that is seen across the differential pressure sensor elements in the flowmeter embodiments of FIGS. 2 and 3. Rather, the differential pressure seen across the pressure sensor 320 is relatively lower because flow from downstream location 313 is further obstructed by the second flow obstructor 350, and is not vented to the atmosphere (which is typically at further downstream location 316). This means that friction, and frictional forces, are of increased effect in the flow regulator 300 relative to the effect that these forces had in the flowmeters 101, 201.

The major sources of error in the mechanical flow controller 300 shown in FIG. 4 are as follows. First, the very act of combining a flow regulator and a regulator in one device induces error. Definitionally, the first flow obstructor 340 must move to reestablish equilibrium even though the opening should be maintained exactly the same for the same flow. This necessary movement should be compared to electronics wherein (i) a set flow level may be detected, and then (ii) an independently adjustable and controllable motor downstream may subsequently, resultantly from this detection, be used to set flow. In other words, an all-mechanical flow regulator is inherently inferior, although possibly less costly, than a flowmeter coupled with an electronic flow control circuit.

A second source of mechanical error in the flow regulator shown in FIG. 300 is resultant from the accuracy of parts. Particularly, any leakage between the member, or rod, 341 and the housing 310 distorts the accuracy of flow regulation. In order to reduce leakage the parts must be made to fit tightly. However, when parts fit tightly then their relative movement is particularly subject to frictional forces resultant from the fluids with which they are in contact.

Finally, a mechanical error is inherent in flow regulator 300 because it is attempting to variably occlude flow at the location of second flow obstructor 350 without inducing any force on the member, or rod, 340. However, this is impossible. The actual forces induced on member, or rod, 341 depend on the shape and on the angles of the opening of the second flow obstructor 350. The second flow obstructor 350 causes a feedback from the circuit of the regulator to the flowmeter, mainly to the member, or rod, 341 which causes a distorted, erroneous, reading at the flowmeter. Thus the action of the regular circuit induces error in the flowmeter upon which the operation of the regulator circuit depends.

Because of these three sources of mechanical error, the flow regulator 300 shown in FIG. 4, and alternative configurations such as those based on the second embodiment of a variable-area flowmeter 201 shown in FIG. 3, are not perfect devices. Nonetheless to certain inaccuracies that are inherent in such devices, the flow regulator 300, and counterpart flow regulators in accordance with the present invention, do exhibit much improved insensitivity to changes in fluid friction and/or fluid viscosity.

A second embodiment of a flow regulator 400 in accordance with the present invention is shown in cutaway view in FIG. 5. The flow regulator 400 again includes a housing 410, a differential pressure sensor 420, a force biasing means 430, a first flow obstructor 440, and a second flow obstructor 450—each functionally related to counterpart elements of the same name within the first embodiment of a variable-area flowmeter 300 shown in FIG. 4. The differential pressure sensor 420 is preferably a flexible elastomeric diaphragm 421. The first flow obstructor 440 is preferably a conically-tipped rod, or member, 441. It rigidly connects via a small pin, or shaft, 442 to the second flow obstructor 450. The second flow obstructor 450 is preferably a plugged and apertured hollow cylinder 451, as illustrated. The force biasing means 430 is preferably a spring 431.

A rigid barrier 470 divides a central chamber that is within, and defined by, housing 410 into lower chamber 411 and intermediate chamber 412. The flexible elastomeric diaphragm 421 divides intermediate chamber 412 from upper chamber 414. The path of fluid flow is from an inlet orifice 413 into lower chamber 411, and then through aperture 471 of barrier 470—where it is variable occluded in its flow by flow obstructor 440 in the form of conically-tipped member 441—to intermediate chamber 412. The fluid then flows from intermediate chamber 412 through one of several side apertures 452 within the second flow obstructor 450 in the form of capped apertured cylinder 451 to the upper chamber 416. Due to the numbers, and sizes, of the side apertures 452 the flowing fluid is substantially unobstructed, and does incur a significant pressure drop, in flowing from the intermediate chamber 412 to the central bore of capped apertured cylinder 451. The fluid then flows through a central aperture 453 in the cap 454 of the capped apertured cylinder 451. In this passage it incurs a substantial pressure drop. The fluid in the uppermost chamber 414 of the housing 410 finally flows through outlet orifice 415, normally to atmospheric pressure.

The total pressure drop of the flowing fluid between inlet orifice 413 and outlet orifice 415 to housing 410 is substantially undergone only at the orifice 471 to obstructor plate 470—which orifice 471 is variably occluded by flow obstructor 440—and at the aperture 453 to second flow obstructor 450—which aperture 453 is of a constant diameter. The diameter of aperture 471 to obstructor plate 470 is preferably approximately 1.5 millimeters. Meanwhile the diameter of the pin, or shaft, 442 to first flow obstructor 440 is approximately 0.5 millimeters. At least the minimal area of pin, or shaft, 442 will always be within the fluid flow channel through orifice 441. The sides of conically capped obstructor member 441 extend in a conical shape so far as to completely occlude the aperture 471, should they be positioned to do so.

The ratio of the area of aperture 471 to the cross-sectional area of the pin, or shaft, 442 is thus approximately 1:9. The appropriate size of orifice 471 is related to (i) the rate at which fluid will desirably flow at a given input pressure, and (ii) the dynamic range over which flow must be regulated during changes in input pressure and/or fluid viscosity. Because the flowing fluid exerts a frictional force on flow obstructor 440, and particularly on the pin, or shaft, 442 thereof, this pin 442 desirably has a cross-sectional area that is no greater than $\frac{1}{4}$ of the area of orifice 471.

Meanwhile, the orifice 453 to the cap 454 of the capped apertured cylinder 451 (the second occluding element 450) is nominally 1 millimeter in diameter. Comparison of the cross-sectional area of this diameter to the open area of orifice 471 (which is nominally of 1.5 millimeter diameter) to obstructor plate 470 when such orifice 471 is minimally occluded by first obstructor 440 (by its pin 442 having a nominal diameter of 0.5 millimeters), the ratio of areas is approximately 1:2. Accordingly, the ratio of the pressure drop which the flowing fluid will experience across variably occluded orifice 471 (when such orifice is maximally open) to the pressure drop across fixed orifice 453 is in the ratio of 1:4.

The ratio of these areas is related to (i) the minimum input pressure at inlet orifice 413, and (ii) the necessary pressure drop that must be experienced by the differential pressure 420 in the form of flexible elastomeric diaphragm 421 in order for such differential pressure sensor 420 to accurately, and timely, respond to variations in any of fluid flow, pressure, and/or viscosity. The requisite pressure across flexible elastomeric diaphragm 421 has been found to beneficially be 8 psi or better while the inlet pressure of the fluid at inlet orifice 413 may be as low as 32 psi. Accordingly, at least $\frac{1}{4}$ of the inlet pressure must be dropped across the fixed orifice 453, and must appear across the differential pressure sensor 420 having the form of flexible elastomeric diaphragm 421. According to this dynamic operational range, the ratio of the size of the fixed orifice 453 to the maximally open size of variable orifice 471 is desirably no less than 1:2 (giving a corresponding pressure ratio no less than 1:4).

In operation of the second embodiment of the fluid flow regulator 400 shown in FIG. 5, an increase/decrease in the pressure of the fluid at inlet orifice 413 results in a corresponding increase/decrease of the differential pressure seen across fixed orifice 453 and across the differential pressure sensor 420, causing a movement of the differential pressure sensor 420 against the fixed force of biasing means 430. This movement serves to move the first occluding element 440 relative to the orifice 471 of obstructor plate 470 so as to variably occlude the fluid flow through orifice 471, and so as to maintain a constant intermediate pressure in intermediate chamber 412. Resultant to such constant intermediate pressure between chambers 412 and 414, the rate of fluid flow through orifice 453, and then through outlet orifice 415, is substantially constant. Accordingly, fluid flow regulation is accomplished.

A third, preferred, embodiment of a fluid flow regulator 500 in accordance with the present invention is shown in FIG. 6. A housing 510 defines a channel flowing fluid between an inlet orifice 511 and an outlet orifice 512. The housing 510 defines a central cavity, or bore, 513 within which a number of stacked cores, or plugs, 514-516 are located. Beneath the lowermost plug 516 is the differential pressure sensor 520 in the form of a flexible elastomeric diaphragm 521. The cores, or plugs, 514-516 are sealed fluid tight to the walls of cavity 513—so that fluid does not flow around the edges of such plugs 514-516—by circumferential O rings 517.

The lowermost core, or plug, 516 defines both a first, fixed-size, orifice 470 and a second orifice 471 which presents a variable open area to fluid flow by action of moveable occluding element 540. The occluding element 540 is substantially in the shape of a cone 541 having an extension region 542 that terminates in a receptacle, or cup, region 543, all as illustrated. The conical occluding element 540 is affixed to the flexible elastomeric diaphragm 521 for moving therewith. A force biasing means 530 in the form of a spring 531 connected to set screw 560 turned by knurled knob 561 serves to bias the occluding element 540 in position against the force of differential pressure sensor 520. The knurled knob 561 and its connected set screw 560 may be turned in order to variably compress the spring 531. It would, of course, be possible to create an embodiment wherein a spring was tensioned, and controllably variably so tensioned, in holding the occluding element 540 against the forces of the differential pressure sensor 520.

In operation of the third, preferred, embodiment of the flow regulator 500 shown in FIG. 6, pressurized fluid received at inlet orifice 511 is channeled via conduit 518 to a one, lower, side of differential pressure sensor 520, and, after a pressure drop occurring from fluid flow across the fixed-size orifice 470 of lowermost plug 516, to a first chamber 580. The pressurized fluid within first chamber 580 then flows through the second orifice 571 of lower plug 516—which orifice is variably occluded by action of occluding element 540—into second chamber 581. The fluid undergoes substantially all the pressure drop between inlet orifice 511 and outlet orifice 512 in its passage through (i) the fixed-size orifice 570 and (ii) the variable-size orifice 571. It will, however, continue to flow from second chamber 581 through a number of relatively large, circumferentially disposed, orifices 573 within the second plug 515 to enter an upper chamber 574 and thence, via a final conduit 575, to outlet orifice 512.

The third, preferred, embodiment of the flowmeter 500 operates so that an increase/decrease differential pressure sensed by differential pressure sensor 540 due to an increase/decrease inlet fluid pressure at inlet orifice 511 moves such differential pressure sensor against the force of force biasing means 530 so as to increase/decrease the occluding of orifice 571. The variable occlusion of orifice 571 will serve to maintain that, as a combination of the pressure in chamber 580 and the variable occlusion of orifice 571, a constant amount of fluid flows through orifice 571, and then via chamber 581, orifices 573, chamber 574, and conduit 575 to outlet orifice 512.

In accordance with the first principle of the present invention, the cross-sectional area of the conical occluding element 541 at its extension region 542 where it serves to variably occlude orifice 571 is at least 20 times smaller, and is more typically 100:1 smaller, than is the area of differential pressure 520 that is subject to the differential fluid pressure across the fixed-size orifice 570 and between the first chamber 580 and (via conduit 518) inlet orifice 511.

In accordance with a second principle of the present invention, the differential pressure sensor 520 in the form of flexible elastomeric diaphragm 521 is substantially insensitive to fluid frictional forces, and to changes in fluid frictional forces due to changes in fluid viscosity, because the substantial portion of such fluid flow as comes into contact with such flexible elastomeric diaphragm 521 is perpendicular to the motion thereof. Basically, there is no flow at all in the side disposed toward conduit 518. Meanwhile, such flow as occurs in the first chamber 580 is neither (i) substantial at the region of the surface of flexible elastomeric diaphragm 521, nor (ii) in the up-down pressure-sensing direction of the motion of flexible elastomeric diaphragm 521.

In accordance with the third principle of the present invention, an increase/decrease frictional force on the flow obstructor 540 resultant from an increase/decrease in fluid viscosity acts mechanically oppositely to the changes in static differential pressure exerted on flexible elastomeric diaphragm 521 from the same increase/decrease in fluid viscosity. Basically, a thicker fluid will accumulate more sluggishly within first chamber 580, and will result in an increased downwards force on the flexible elastomeric diaphragm 521. Meanwhile, the same increased viscosity fluid will exert more force on the occluding element 540, particularly in the extension region 541 thereof, when it flows through orifice 571. These two forces act oppositely, and tend to cancel. The exterior surface contours, or surface finish, of each of the flexible elastomeric diaphragm 521 and the flow obstructor 540 may be empirically adjusted so as to realize a more substantially exacting force cancellation over a broad operational range.

In accordance with a fourth principle of the invention, the area of fixed-size orifice 570 is preferably no less than 1:2, and is nominally 1:4, relative to the (maximally unobstructed) area of variable-size orifice 571. In particular, fixed-size orifice 570 is nominally 1 millimeter in diameter, variable-size orifice 571 is nominally 1.5 millimeters in diameter, and the diameter of occluding element 540 at its extension region 541 where it serves to (minimally) obstruct variable-size orifice 571 is nominally 0.5 millimeters. By this range of diameters, the pressure drop that occurs across fixed-size orifice 570, and which is sensed by differential pressure sensor 520, is at least $\frac{1}{4}$ of the pressure drop experienced across variable-size orifice 571. Such a size ratio is suitable for (i) a working range of about 2.5 psi to 20 psi, and more nominally 8 psi pressure drop across fixed-size orifice 570 and flexible elastomeric diaphragm 521, while (ii) the fluid flow pressure at the inlet orifice 511 varies from about 10 psi to about 80 psi, and is more commonly about 32 psi. These particular pressures, and the flow rates supported by the orifices of indicated size, will be particularly suitable for use of the third embodiment of a fluid regulator 500 within the post-mix soft drink dispensing apparatus to be shown in FIGS. 9 and 10.

In accordance with a fifth principle of the invention, the ratio of the area of the second orifice 571 to the cross-sectional area of its occluding element 540 at the extension region 541 thereof where it serves to minimally (variably) occlude such orifice 571 is greater than 4:1. In accordance with the previously-stated nominal diameters of 1.5 millimeters for orifice 571 and 0.5 millimeters for extension region 542, the ratio of areas is more commonly 9:1.

In accordance with a sixth principle of the invention, the fixed-size first orifice 570 is located upstream from the variable-size orifice 571. Particularly in the case when the flowing fluid is gaseously-impregnated fluid (e.g., carbonated water) at high pressure, this arrangement prevents that any outgassing of ($CO_2$) gas from the fluid (carbonated water) should result in inaccuracies in the flow regulation. In particular, a typical inlet pressure for fluid in the form of carbonated water may be as high as 80 psi at inlet orifice 511. By operation of the flow regulator, the pressure within first chamber 580 is typically 80 psi while the pressure in second chamber 581 is nominally the output pressure, or 0 psi. Because the pressure drop from 90 psi to 80 psi is minor, any outgassing from the gaseously-impregnated fluid (carbonated water) is minor in the region of fixed-size orifice 570, and across the differential pressure sensor 520. Any outgassing from the gaseously-impregnated fluid (carbonated water) occurring at the region of second chamber 581 is inconsequential to the fluid flow regulation, and to the operation of the third embodiment of fluid flow regulator 500.

Still other attributes of the invention are observable within the third, preferred, embodiment of a fluid flow regulator 500 shown in FIG. 6. The broad, and ample, size of the differential pressure sensor 520, particularly in its form as a flexible elastomeric diaphragm 521, permits the fluid flow regulator to respond very quickly to changes in the inlet fluid pressure at inlet orifice 511. The flowmeter is normally sufficiently fast so as to account for changes in fluid pressure, amounting to hydrodynamical shock waves, that are of less than 1 second rise time.

The regulator is not substantially subject to clogging, contamination, age, or wear. It provides reliable and accurate service under a broad range of operational conditions.

In accordance with the preceding discussion, certain other alterations and adaptations of the present invention will suggest themselves to practitioners in the arts of fluid flow and flow measurement. Once the fundamental principles of the present invention regarding the separation of the differential-pressure-sensing and the channel-occluding functions are recognized, many diverse variations in the construction of flowmeters and flow regulators constructed in accordance with these principles are possible. It will of course be recognized that in these constructions the larger flow pressure sensing element should normally be positioned so that its sensing operation is not sensitive to fluid friction and/or fluid viscosity. Meanwhile, the flow occluding element, which may unavoidably remain sensitive to fluid friction and/or fluid viscosity, should be minimized in area relative to the viscosity-insensitive pressure sensor.

The present invention further contemplates a fluid dispensing system, normally one that mixes precisely two fluids together in prescribed relative proportion, that is (i) insensitive to variations in the fluid pressure or the fluid viscosity of either or both fluids, (ii) continuous and constant in its regulation of fluids, flows so that no deviation from a prescribed mix ratio ever occurs, even instantaneously, (iii) conveniently adjustable in the ratio of fluids dispensed, and (iv) highly accurate to dispense a predetermined volume of mixed fluids.

One manner of realizing this aspect of the present invention is to sense the flow rate of each fluid component that is subject to viscosity changes, for example the flow rate of the syrup component within a post-mix soft drink dispenser, by a flowmeter in accordance with the invention that is substantially insensitive to variations in fluid viscosity. The flow rate of any fluid that does not undergo substantial changes in viscosity, for example the carbonated water in a post-mix soft drink dispenser, (i) may be sensed by a viscosity-insensitive flowmeter, (ii) may be sensed by a conventional-type flowmeter, or, (iii) may not be sensed at all and may be, instead, regulated to be at a predetermined rate regardless of pressure variations, preferably by use of a simple and inexpensive flow washer.

The pressure-sensing function is performed by a differential pressure sensor that is substantially insensitive to fluid frictional forces, and to changes in fluid viscosity. Its variable-channel-area-occluding function is performed by a flow obstructor, connected to the pressure sensor for moving therewith, that is substantially sensitive to fluid frictional forces, and to changes in these forces due to changes in fluid viscosity. The ratio of the pressure force exerted on the differential pressure sensor to the fluid frictional forces exerted on the flow obstructor approximately equals the ratio of the area of the pressure sensor to the area of the flow obstructor. This ratio is made very small, typically less than 1%. The flowmeter accordingly exhibits substantial insensitivity to changes in fluid friction due to changes in fluid viscosity.

An electronic circuit operates on the signals produced by the one or more flowmeters in order to regulate the corresponding one or more fluid flows, and to maintain such flows in the prescribed relative proportion.

The maintenance of the fluid flows in the prescribed relative proportion is continuous and constant. No flow control valve or valves are cycled on and off so as to produce pulses, or squirts, of one fluid or another. Neither is any flow started before, or prolonged after, any other flow so as to produce a preliminary, or subsequent, dollop of one liquid or another. Both liquids are constantly and continuously dispensed in the prescribed relative proportion from the beginning to the end of any dispensing operation, howsoever long or short in time or large or small in volume.

Figure 7:
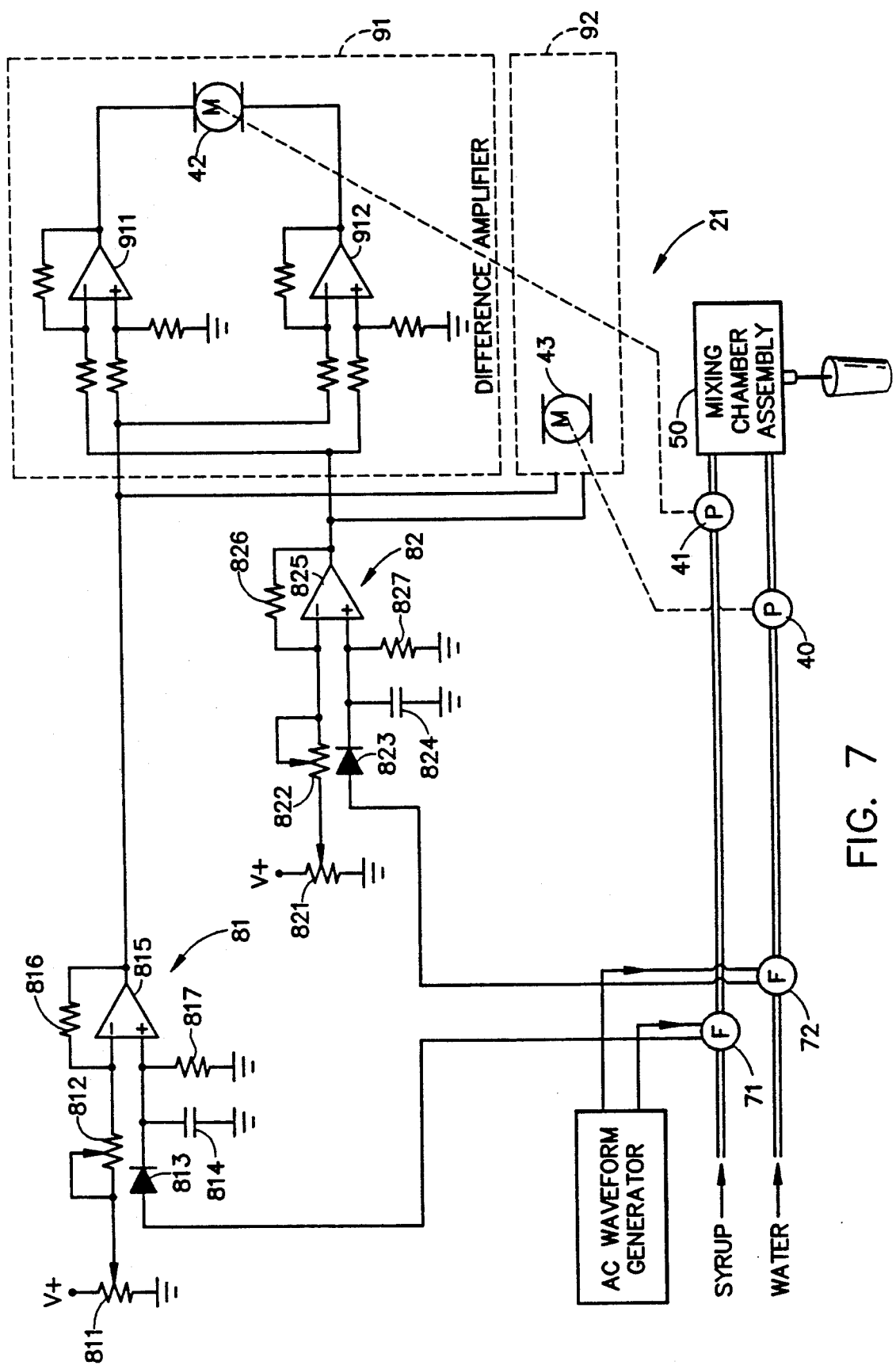
FIG. 7 is a block diagram of a first embodiment of post-mix soft drink dispenser, using two flowmeters in accordance with the present invention, for mixing together carbonated water and soft drink syrup in a prescribed mix ratio.
Figure 8:
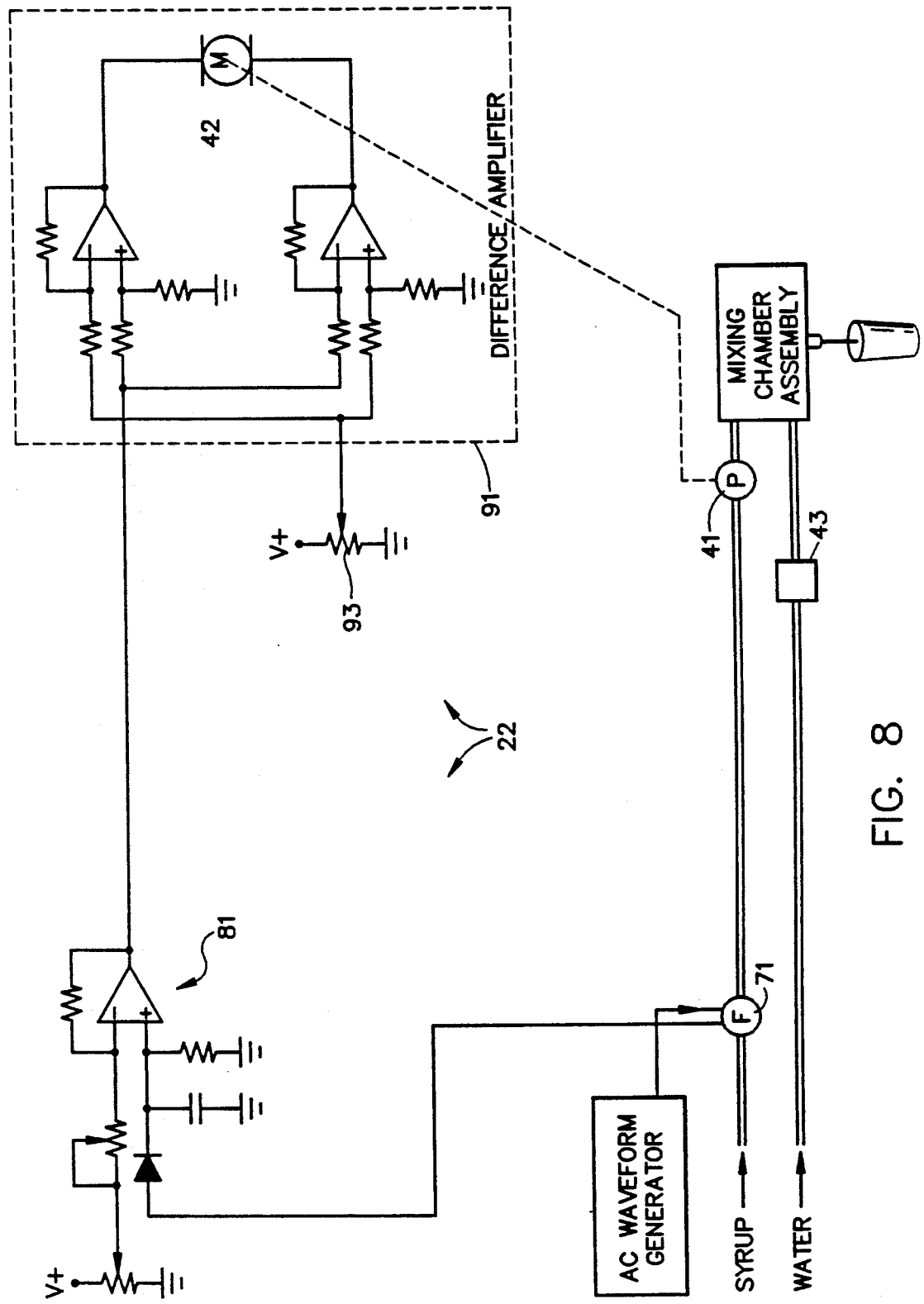
FIG. 8 is a block diagram of a second embodiment of a post-mix soft drink dispenser, using one flowmeter in accordance with the present invention and one flow washer, for mixing together carbonated water and soft drink syrup in a prescribed mix ratio.

The continuous and constant maintenance of the fluid flows in the prescribed relative proportion may, in the embodiments, of FIGS. 7 or 8, be realized by (i) continuously operating flowmeters, (ii) a continuously operating control circuit, and (iii) an electronically controllable flow regular that are continuously variably adjustable to regulate fluid flow. The (iii) electronically controllable flow regulator is preferably a motorized metering pin.

The electronic control circuit, is typically based on simple analog amplifiers. It may alternatively be based upon a microprocessor, is infinitely adjustable in the ratio of the fluids dispensed. The ratio is typically adjusted by adjusting the relative gain between two amplifiers. Each amplifier is responsive to the detected flow rate of an associated fluid to control a motorized metering pin in order to regulate the flow of an associated fluid. The gain adjustment requires no electrical test equipments, and is simply accomplished with a screwdriver in response to visual observation of fluid flow.

A predetermined mixed volume of two fluids is dispensed by integrating in real time the fluid flow of each fluid. A dispenser apparatus so integrating actual fluid flows to the sum of a predetermined volume (not shown) may be conveniently programmed to dispense any desired volume. In one particularly simple and convenient preprogramming process, the operator causes the fluid dispenser to continuously flow fluid by manually demarking the beginning and the end of a time interval during which the desired volume of flowed fluid is accumulated. The dispenser calculates by integration the precise amount of fluid, which need not be an arbitrary number of fluid volume units, that was flowed during the manually-demarked time interval. Thereafter during use for dispensing the dispenser will dispense precisely this preselected volume of mixture.

Such an electronic circuit for controlling fluid flow in response to viscosity-insensitive flowmeters, and for integrating fluid flows over time to gate the flow(s) of a predetermined volume(s) is most completely taught in companion U.S. patent application Ser. No. 331,880, the contents of which are incorporated herein by reference. However, for the present purposes it will be sufficient to understand the function of the electronic flow control circuit of FIGS. 7 and 8.

Figure 9:
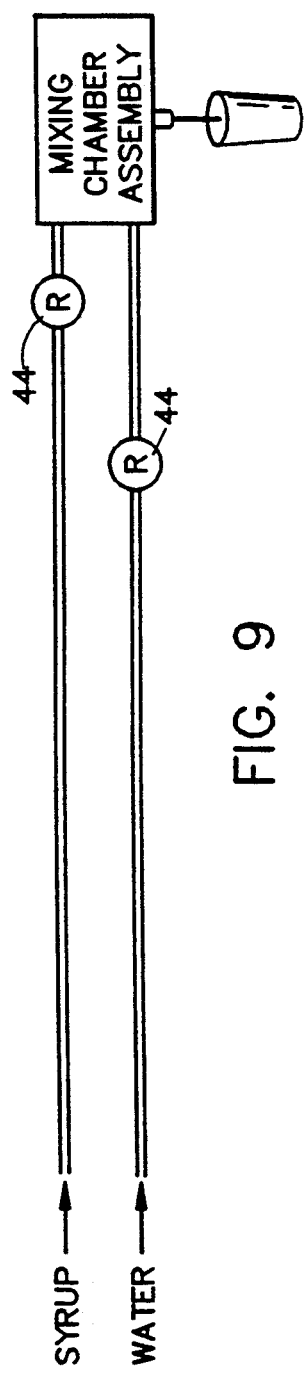
FIG. 9 is a block diagram of a third embodiment of a post-mix soft drink dispenser, using two flow regulators in accordance with the present invention, for mixing together carbonated water and soft drink syrup in a prescribed mix ratio.
Figure 10:
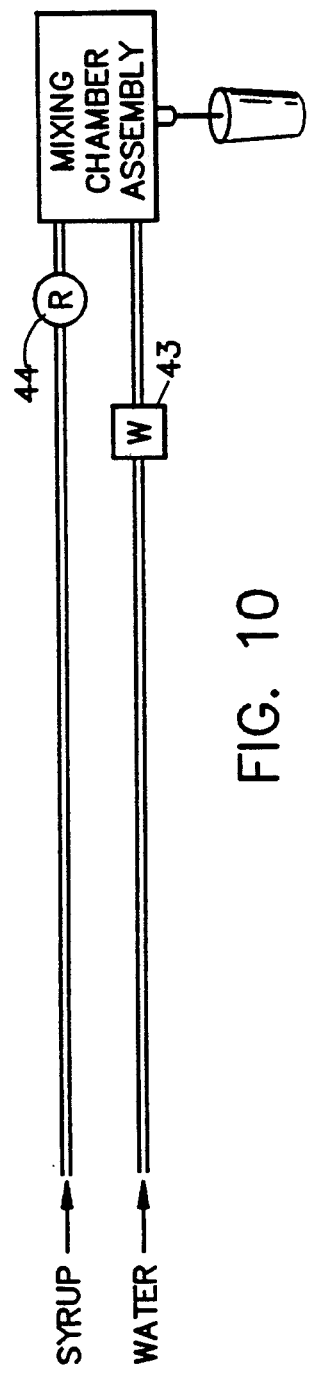
FIG. 10 is a block diagram of a fourth embodiment of a post-mix soft drink dispenser, using one flow regulator in accordance with the present invention and one flow washer, for mixing together carbonated water and soft drink syrup in a prescribed mix ratio.

Block diagrams of two embodiments of post-mix soft drink dispenser using flowmeters in accordance with the present invention are shown in FIGS. 6 and 7, and two embodiments alternatively using flow regulators in accordance with the present invention are shown in FIGS. 9 and 10. The flowmeters and flow regulators of the present invention are readily retrofittable to existing post-mix soft drink dispensers.

Referencing FIG. 7, the flows of syrup and water are respectively sensed by flowmeters 71, 72 in accordance with the present invention. These flowmeters 71, 72 are substantially insensitive to fluid friction, and to changes in fluid friction due to changes in fluid viscosity, in their operation.

The syrup and water flow rate signals respectively developed at viscosity-insensitive flowmeters 71 and 72 are respectively amplified in the syrup flow signal amplifier 81 and the water flow signal amplifier 82. Each of the amplifiers 81, 82 has an adjustable offset established by variable resistors 811, 821, which are typically of value 10 kilohms. Each of the amplifiers 81, 82 has a variable gain established by the variable resistors 812, 822, also typically of value 10 kilohms. The amplifiers 81, 82 are respectively diode-isolated by diodes 813, 823—typically types 1N914—and alternating current noise is filtered by capacitors 814, 824—typically of value 1 microfarads. Operational amplifiers 815, 825 are typically type LM324. They are biased in operation by bias resistors 816, 826 and 817, 827 which are all typically of value 10 kilohms.

The adjustable offset resistors 811, 821 permit, in conjunct, that the syrup flow signal amplifier 81 and the water flow signal amplifier 82 may be adjusted to provide equal output signal strengths when the respective syrup and water flows detected by flowmeters 71 and 72 are at a broad range of allowable ratios relative to each other. The syrup flow signal amplifier 81 and the water signal amplifier 82 may typically be adjusted to provide equal output signals when the detected syrup and water flows are at ratios within the range from 1:1 to 10:1. The ratio between detected syrup and water flows that produce equal signal outputs need not be in integer ratio and can be, for example, a ratio like 2:1. Note that any intrinsic difference in the signal levels resultant from viscosity-insensitive flowmeters 71, 72 in the detection of an equal fluid flow rate may be compensated for by the offset within amplifiers 81, 82. Similarly, it is not required that the syrup and the water should flow through pipes of equal diameter.

The signal outputs from the syrup flow signal amplifier 81 and the water flow signal amplifier 82 are received, in parallel, at difference amplifiers 91, 92. The difference amplifier 91 is formed from appropriately-resistor biased operational amplifiers 911, 912, which are typically of type LM324. The difference amplifier 92 is formed equivalently. The combined signal outputs of the operational amplifiers of the difference amplifiers 91, 92 respectively drive d.c. motors 913, 923. The motors 913, 923 are respectively mechanically linked to metering pins 40, 41.

The motors 913, 923 operate to rotate the metering pins 40, 440 so that the flow rate signals produced by flowmeters 71, 72 as amplified in amplifiers 81, 82 will be equal, meaning that the amplified signals will not be quantatively different. At this time the flow of syrup and water to the mixing chamber assembly 50 will be at the prescribed, predetermined, mix ratio.

The responsiveness of the motors 913, 923 and the metering pins 40, 41 controlled thereby to variations in fluid flow detected by flowmeters 71, 72 may be adjusted by setting the gain of amplifiers 81, 82 respectively at variable resistors 812, 822. Normally the gain of the amplifiers 81, 82 is set so that the motorized metering pins 40, 41 respond promptly to all detected variations, but do not chatter in response to uneliminatable mechanical and electronic noise arising in the first embodiment of the control circuit 21.

It will be understood that any electronically controllable flow regulator could be controlled by the control circuit 21, and also by the counterpart control circuit 22 shown in FIG. 8. The motorized metering pins 40, 41 are preferred for use as electronically controllable flow regulators because of their proven suitability to beverage dispensing.

A second embodiment of a post-mix soft drink dispenser using flowmeters in accordance with the present invention is shown in FIG. 8. The control circuit 22 shown in FIG. 7 is a simplification of the first embodiment of the control circuit 21 shown in FIG. 6. The flowmeter 72, difference amplifier 92, and metering pin 40 of the first embodiment (shown in FIG. 7) are replaced with a mechanical flow regulator 43. This flow regulator 43 located in the water feed line is preferably a simple prior art flow washer.

A flow washer 43 is in the form of a annular ring, or washer. It is made of a flexible material, typically plastic or rubber. The flow washer 43 is positioned within a bore flowing fluid, as illustrated in FIG. 8. It is typically disposed within the bore so as to present a portion of a spheroidal surface with its convex side disposed upstream. Variations in fluid flow cause the flow washer 43 to flex, thereby enlarging or constricting its central aperture. This flexure serves to variously constrict, or enable, fluid flow in accordance that the fluid pressure is respectively higher or lower. The aggregate effect is to maintain the net fluid flow rate approximately constant for a range of fluid pressures.

In a second embodiment of a soft drink dispenser using a flowmeter in accordance with the present invention, the flow washer 43 is used within the water feed line. The water in this line is not substantially subject to viscosity variations with changes in temperature. Its pressure, may however, vary over a range, typically 70 to 120 pounds per square inch in accordance with normal short and long term variations in the water supply. The flow regulator 43 in the form of a flow washer serves to accommodate for these variations, and to maintain the rate of water flow to be approximately constant at all times.

Meanwhile, a signal derived from viscosity-insensitive flowmeter 71 located in the syrup line is processed in syrup flow signal amplifier 81 and compared to a reference voltage derived from resistive voltage tap 93 in difference amplifier 91. A signal reflecting the difference between the detected, and desired, syrup flow rate is developed to drive motor 42 which is mechanically linked to metering pin 41. The rate of fluid flow is accordingly constantly and continuously held at a predetermined level despite variations in the pressure and/or the viscosity of the syrup.

The second embodiment dispenser having the control circuit 22 shown in FIG. 8 is not preferred over the first embodiment dispenser shown in FIG. 7, or the third and fourth embodiment dispensers to be shown in FIGS. 9 and 10, because it is generally less accurate than these other embodiments. Despite its extremely simple construction, the second embodiment dispenser having the control circuit 22 will, however, generally control that fluids will be mixed in a prescribed mix ratio more accurately than such control is accomplished by prior circuits. Moreover, this control is substantially unaffected by variations in pressure and/or viscosity of the syrup component, or by normal variations in the pressure of the water component.

Third and fourth embodiments of a soft drink dispensers this time using a flowmeter in accordance with the present invention, are block diagrammed in FIGS. 9 and 10. In the embodiment shown in FIG. 9 two viscosity-insensitive mechanical flow regulators 44 —for example the preferred third embodiment flowmeter 500 shown in FIG. 6—are positioned in the syrup and water lines. The flow regulators are adjusted by their variable force biasing means (the spring, set screw, and knurled knob) so as to flow fluids at the desired rates. The rates may be determined empirically by measuring the fluid flow through one line, or the other, over an equal interval of time.

A fourth, preferred, embodiment of a soft drink dispenser using a viscosity-insensitive flow regulator 44 in accordance with the present invention within the syrup line, and a flow washer 43 within the water line, is shown in FIG. 10. When the soft drink dispenser is installed the flow which occurs through the flow washer 43 at the prevailing temperatures and pressures is normally measured empirically over a fixed period of time. The flow regulator 44 is then adjusted so as to provide syrup, again at the then-prevailing temperatures and pressures, in the desired relative proportion. Both the flow washer 43, and the viscosity-insensitive flow regulator 44 in accordance with the present invention, will thereafter operate to maintain the flows within their respective lines content over a usable operational range. Neither component is appreciably subject to go out of adjustment, and maintenance and/or readjustments are rare.

In accordance with the preceding discussion, the present invention will be recognized to accord considerable flexibility in the precision dispensing of fluids at a prescribed ratio, and to a predetermined volume. Because the fluid flows are very accurately determined, in a substantially viscosity-insensitive manner, it is possible to integrate such flows over time as a positive indication of the volume of each fluid component, and the total volume of all fluid components, that are dispensed. The flow rate of each fluid component is normally controlled, in real time, to be in a prescribed relative proportion to other fluid components. Correspondingly, the two or more fluids are continuously and constantly in the prescribed relative proportion.

In accordance with the preceding discussion, it will be recognized that the principles of the present invention are readily extensible to the control of more than two fluids, and to certain individual ones of a multiplicity of fluids on a selectable basis. For example, the embodiment of the control circuit 23 shown in FIG. 8 might be extended to a multiplicity of fluid flow lines, such as lines used, for example, for the flow of different color paints. By selectable control of the fluid flows within various lines to be at exacting relative proportions, the flows of all such fluids could be integrated in real time until a specified volume had been precisely dispensed.

In accordance with these and other aspects of the present invention, the invention should be interpreted broadly, in accordance with the following claims, only, and not solely in accordance with those particular embodiments within which the invention has been taught.

What is claimed is:

1. A fluid flow regulator comprising:
  a housing defining a channel for transporting a flowing fluid from an inlet where the fluid is at an inlet fluid pressure to an outlet where the fluid is at an outlet fluid pressure that is less than the inlet fluid pressure;
  the housing's channel having a first constricted region restricting fluid flow between its inlet and its outlet, across which fluid-flow-restricting constricted region the fluid pressure incurs a first pressure drop;
  the housing's channel having a second constricted region restricting fluid flow between its inlet and its outlet, across which fluid-flow-restricting constricted region the fluid pressure incurs a second pressure drop;
  the sum of the first pressure drop and the second pressure drop substantially totaling a pressure drop between the inlet fluid pressure and the outlet fluid pressure;
  a differential pressure sensor, located within the housing's channel so as to experience the first pressure drop across the channel's first constricted region, the differential pressure sensor moving in response to the first pressure drop;
  wherein the differential pressure sensor is, because of its movement relative to the flowing fluid, at least slightly sensitive in such movement to fluid friction and thus to changes in fluid friction caused by changes in fluid viscosity;
  a flow obstructor mechanically connected to the differential pressure sensor for moving therewith in order to variably occlude the housing's channel at its second constricted region;

wherein the flow obstructor is, because of its movement to obstruct the fluid flow at the channel's second constricted region, sensitive in such movement to fluid friction and thus to changes in fluid friction caused by changes in fluid viscosity;

a force basing means, operating between the housing and both of the mechanically-connected pressure sensor and flow obstructor, for biasing with a constant force (i) the differential pressure sensor against its movement in response to the first pressure drop, and (ii) the flow obstructor in a direction so as to less substantially obstruct the channel's second constricted region, therein to more substantially flow fluid therethrough this second constricted region at a lower second pressure drop;

wherein because the total fluid pressure drop from inlet to outlet is the sum of the first and the second pressure drops, then the movement of the flow obstructor under force of the force biasing means in the direction so as to lower the second pressure drop correspondingly raises the fist pressure drop, therein serving to move the differential pressure sensor against the biasing force in response to this raised first pressure drop until an equilibrium is reached;

wherein at equilibrium a force on the differential pressure sensor resultant from the first pressure drop will be constant, and equal to the constant force of the force biasing means minus a frictional force of the flowing fluid against the flow obstructor;

the mechanical connection of the flow obstructor to the differential pressure sensor being so that an increased fluid frictional drag force on the flow obstructor where it moves to variably occlude the housing's channel at its second constricted region acts mechanically oppositely to a change in static differential pressure on the pressure sensor due to the same increase in fluid frictional drag force, the mechanically oppositely-acting forces tending to cancel each other.

2. The fluid flow regulator according to claim 1 wherein the differential pressure sensor senses the first pressure drop over a first area;

wherein the flow obstructor presents a second area to the flowing fluid at the channel's second constricted area where it obstructs the flow thereof;

wherein the first area is large relative to the second area;

whereby the insensitivity of the flow regulator to fluid frictional forces, and to changes in fluid frictional forces with changes in fluid viscosity, is correspondingly large because the ratio of forces, resulting from the first pressure drop, that are exerted on the pressure sensor to the frictional forces exerted on the flow obstructor approximately equals the ratio of the first area of the pressure sensor to the second area of the flow obstructor.

3. The fluid flow regulator according to claim 2 wherein the ratio of the pressure sensor's first area to the flow obstructor's second area is greater than 20:1.

4. The fluid flow regulator according to claim 1 wherein the differential pressure sensor is flow-connected across the first constricted region between upstream and downstream locations of the housing's channel for moving in response to the first pressure drop between these upstream and downstream locations, and this moving is substantially perpendicular to a fluid flow that is across at least one side of the differential pressure sensor on a one of the upstream and downstream sides thereof.

5. The fluid flow regulator according to claim 4 wherein the differential pressure sensor is moving substantially perpendicular to a fluid flow on the downstream side thereof.

6. The fluid flow regulator according to claim 1 wherein the ratio of the area of the channel's second constricted region to the area of the channel's first constricted region is greater than 2:1.

7. The fluid flow regulator according to claim 6 wherein the ratio is approximately 4:1.

8. The fluid flow regulator according to claim 1 wherein the ratio of the area of the channel's first constricted region to the area of the flow obstructor where it operates to variably occlude the channel's second constricted region is greater than 4:1.

9. The fluid flow regulator according to claim 8 wherein the area ratio is approximately 9:1.

10. The fluid flow regulator according to claim 1 wherein the channel's first constricted region is upstream of the channel's second constricted region.

11. The fluid flow regulator according to claim 1 wherein the differential pressure sensor comprises:
a diaphragm for moving by flexing; and wherein the flow obstructor comprises:
a member connected to the diaphragm so that when the diaphragm flexes then the member moves to variably occlude the channel's second constricted region and thereby regulate the channel's fluid flow.

12. The fluid flow regulator according to claim 11 wherein the flexible diaphragm defines an orifice through which the fluid flows.

13. The fluid flow regulator according to claim 11 wherein the member comprises:
a rod having a distal end region, opposite a proximal end connection to the diaphragm, that is complementary in shape to the shape of an opening of and at the channel's second constricted region and that moves from greater and lessor proximity to the opening so as to respectively permit relatively more, and relatively less, fluid flow in the channel.

14. The fluid flow regulator according to claim 1 wherein the force biasing means comprises:
a proportional force biasing means for force biasing the movement of the differential pressure sensor in proportion to the magnitude of such movement.

15. The fluid flow regulator according to claim 14 wherein the proportional force biasing means comprises:
a linearly proportional force biasing means for force biasing the movement of the differential pressure sensor in substantially linear proportion to the magnitude of such movement.

16. The fluid flowmeter according to claim 15 wherein the linearly proportional force biasing means comprises:
a spring.

17. The fluid flow regulator according to claim 1 further comprising:
force biasing adjustment means for adjusting the strength of the force biasing of the differential pressure sensor, and also of the first flow obstructor connected thereto and moving therewith.

18. The fluid regulator according to claim 17 wherein the force biasing means comprises:
a spring; and wherein the force biasing adjustment means comprises:
means for variably biasing the spring.

19. A fluid flow regulator comprising:
a housing defining a channel for flowing fluid in a flow direction
from an inlet where the fluid is at an inlet fluid pressure
past, in either order, (i) a flow-controlling location where the cross-sectional area of fluid flow is variably occluded and across which the fluid undergoes a variable first pressure drop, and (ii) a flow-restricting location where the cross-sectional area of fluid flow i constricted to a constant area and across which the fluid undergoes a second pressure drop,
to an outlet port where the fluid is the outlet pressure;
a differential pressure sensing means, located between flow-connections to the flowing fluid at locations upstream and downstream of the channel's flow-restricting location, for moving in response to the second pressure drop;
wherein the differential pressure sensing means is, because of its movement relative to the flowing fluid, at least slightly sensitive in such movement to fluid friction and thus to changes in fluid friction caused by changes in fluid viscosity;
a force biasing means, connected between the differential pressure sensing means and the housing, for force-biasing with a constant force the movement of the differential pressure sensing means in a direction against the pressure force of the second pressure drop; and
a flow control means, responsive to the differential pressure sensing means for moving in accordance therewith, for moving relative to the channel's flow-controlling location to variably occlude the channel at this flow-controlling location, therein to variably determine the first pressure drop;
wherein the flow control means is, because of its movement to obstruct the fluid flow at the channel's second constricted region, sensitive in such movement to fluid friction and thus to changes in fluid friction caused by changes in fluid viscosity;
wherein the sense of a coupling of movement between the flow control means and the differential pressure sensing means, and a sense of the variably-occluded fluid flow and variably-determined pressure drop resultant therefrom, is so as to make that the variable first pressure drop controlled by action of the flow control means will always be so as to produce a downstream pressure that is fixed relative to the outlet pressure, which downstream pressure drop is determined in its magnitude by the constant force of the force biasing means substantially regardless of changes in the inlet fluid pressure over an operational range;
wherein because the second pressure drop is maintained constant across the channel's flow-restricting location of constant area, the rate of fluid flow through this flow-restricted location and out the channel's outlet port is regulated to be constant substantially regardless of changes in the output pressure;
the mechanical connection of the flow obstructor to the differential pressure sensor being so that an increased fluid frictional drag force on the flow obstructor where it moves to variably occlude the housing's channel at its second constricted region acts mechanically oppositely to a change in static differential pressure on the pressure sensor due to the same increase in fluid frictional drag force, the mechanically oppositely-acting forces tending to cancel each other.

20. The fluid flow regulator according to claim 19.
wherein the differential pressure sensing means moves substantially perpendicularly to a local direction of flow of the flowing fluid with which it comes into contact, and is thus substantially insensitive in such movement (i) to fluid friction, (ii) to changes in fluid friction due to changes in fluid viscosity, and thus (iii) to fluid viscosity;
wherein the flow control means is, because of its movement to obstruct the fluid flow at the channel's flow-restricting control location, sensitive in such movement (i) to fluid friction, (ii) to changes in fluid friction due to changes in fluid viscosity, and thus (iii) to fluid viscosity;
wherein the area of the differential pressure sensing means, with its substantial insensitivity to fluid friction and viscosity, is large relative to the area of the flow controller means, with its sensitivity to fluid friction and viscosity;
wherein the fluid flow regulator is thus substantially insensitive to fluid friction, and to fluid viscosity.

21. The fluid flowmeter according to claim 20 wherein the differential pressure sensing means comprises:
an apertured diaphragm flow-connected on its two sides to the locations upstream and downstream of the channel's flow-restricting location; and wherein the flow control means comprises:
a plunger rod, connected to the diaphragm for moving along with the diaphragm, that presents a relatively smaller area than does the flat side of the diaphragm where the plunger rod moves relative to the channel's flow-restricting location in order to variably occlude the channel;
wherein the area of the flat side of the diaphragm that is large relative to the area of the plunger rod makes the movement of the diaphragm and the connected plunger rod, and the overall flowmeter, substantially insensitive to fluid friction, and to fluid viscosity.

22. The fluid flowmeter according to claim 20 wherein the force biasing means comprises:
a spring.

23. The fluid flowmeter according to claim 22 wherein the differential pressure sensing means comprises:
a diaphragm; and wherein the flow controller means comprises:
a plunger connected to the diaphragm for moving along with the diaphragm;
wherein a neutral spatial position of the diaphragm is established by the biasing means during a presence of a predetermined pressure difference, therein causing the plunger to be positioned to make the area of fluid flow to be greater than zero, but less than maximum, at the channel's flow-control location during the predetermined pressure difference.

* * * * *